United States Patent
Nakamura et al.

(10) Patent No.: US 8,703,298 B2
(45) Date of Patent: Apr. 22, 2014

(54) GAS-BARRIER FILM, GAS-BARRIER LAYERED BODY, AND PROCESS FOR PRODUCING SAME

(75) Inventors: Osamu Nakamura, Koga (JP);
Tomoyoshi Hakamata, Koga (JP);
Akira Nomoto, Koga (JP)

(73) Assignee: Tohcello Co., Ltd., Tokyo (JP)

( * ) Notice: Subject to any disclaimer, the term of this patent is extended or adjusted under 35 U.S.C. 154(b) by 904 days.

(21) Appl. No.: 11/568,783

(22) PCT Filed: May 10, 2005

(86) PCT No.: PCT/JP2005/008834
§ 371 (c)(1),
(2), (4) Date: Aug. 14, 2007

(87) PCT Pub. No.: WO2005/108440
PCT Pub. Date: Nov. 17, 2005

(65) Prior Publication Data
US 2008/0262179 A1    Oct. 23, 2008

(30) Foreign Application Priority Data

| | | |
|---|---|---|
| May 10, 2004 | (JP) | 2004-139977 |
| Jun. 23, 2004 | (JP) | 2004-184832 |
| Aug. 9, 2004 | (JP) | 2004-232802 |
| Oct. 1, 2004 | (JP) | 2004-289545 |
| Nov. 18, 2004 | (JP) | 2004-334073 |
| Mar. 16, 2005 | (JP) | 2005-074749 |

(51) Int. Cl.
*B32B 27/30* (2006.01)
*B05D 3/02* (2006.01)

(52) U.S. Cl.
USPC ........ 428/500; 428/522; 427/372.2; 427/377; 427/384; 427/385.5; 427/487; 526/240; 526/241

(58) Field of Classification Search
None
See application file for complete search history.

(56) References Cited

U.S. PATENT DOCUMENTS

| | | | | |
|---|---|---|---|---|
| 3,547,683 A | * | 12/1970 | Hayes et al. | ........ 427/497 |
| 3,856,643 A | * | 12/1974 | Nakamoto et al. | ........ 522/96 |
| 4,298,698 A | * | 11/1981 | Kawase et al. | ........ 521/27 |
| 4,486,489 A | * | 12/1984 | George | ........ 428/220 |
| 5,739,232 A | * | 4/1998 | Hazell et al. | ........ 526/240 |
| 7,476,712 B2 | * | 1/2009 | Tanaka et al. | ........ 525/330.2 |

FOREIGN PATENT DOCUMENTS

| | | |
|---|---|---|
| JP | 2002-275338 A | 9/2002 |
| JP | 2003-292713 A | 10/2003 |
| JP | 2004-34616 A | 2/2004 |
| JP | 2004-137495 A | 5/2004 |
| JP | 2004-307731 A | 11/2004 |

OTHER PUBLICATIONS

International Search Report of PCT/JP2005/008834, date of mailing Aug. 16, 2005.

* cited by examiner

*Primary Examiner* — Monique Jackson
(74) *Attorney, Agent, or Firm* — Westerman, Hattori, Daniels & Adrian, LLP

(57) ABSTRACT

The gas-barrier film of the present invention basically comprises a polymer of a polyvalent metal salt of an unsaturated carboxylic acid compound which gives an infrared absorption spectrum in which the ratio of the absorbance $A_0$ at around 1,700 $cm^{-1}$ attributable to V C=O of the carboxylic acid group to the absorbance A at around 1,520 $cm^{-1}$ attributable to V C=O of the carboxylate ion, $A_0/A$, is lower than 0.25, and this gas-barrier film and a gas-barrier layered body having the film can be manufactured by applying a solution of a polyvalent metal salt of an unsaturated carboxylic acid compound having a degree of polymerization lower than 20 to at least one side of a substrate layer and then polymerizing the polyvalent metal salt of the unsaturated carboxylic acid compound.

12 Claims, No Drawings

GAS-BARRIER FILM, GAS-BARRIER LAYERED BODY, AND PROCESS FOR PRODUCING SAME

TECHNICAL FIELD

The present invention relates to a gas-barrier film that is transparent, has gas barrier properties against oxygen, water vapor and the like and is particularly suited to packaging materials with excellent gas barrier properties under conditions of high humidity, to a gas-barrier layered body, and to a process for producing the same.

BACKGROUND ART

Transparent gas-barrier films formed by depositing an inorganic oxide such as silicon oxide, aluminum oxide or the like by vacuum deposition, sputtering, ion plating, chemical vapor phase epitaxy or the like on a film substrate have become popular in recent years as gas-barrier materials against oxygen, water vapor or the like.

The problem is that since these transparent gas-barrier films are generally formed by depositing an inorganic oxide on the surface of a substrate consisting of a tough, transparent biaxial oriented polyester film, left as is the deposited layer is vulnerable to abrasion during use, and when the film is used as a packaging film, the gas barrier properties may be adversely affected by cracks in the inorganic oxide that occur due to abrasion and stretching during subsequent printing or lamination or during filling with the contents, so adequate gas barrier properties cannot be achieved simply with inorganic oxide deposition.

Methods have been proposed of laminating polyvinyl alcohol or ethylene-vinyl alcohol copolymer with gas barrier properties on a biaxial oriented film substrate (see for example Japanese Patent Application Laid-open No. S60-157830, Claims), or covering a biaxial oriented film substrate with a composition of polyvinyl alcohol and poly(meth)acrylic acid (see for example Japanese Patent Publication 3203287, Claim 1). However, the oxygen barrier properties of a gas-barrier film formed by laminating polyvinyl alcohol are lower under highly humid conditions, while a composition of polyvinyl alcohol and poly(meth)acrylic acid has problems of productivity because it requires long-term heating at high temperatures to promote esterification and improve the gas barrier properties of the film, and its gas barrier properties are also insufficient under humid conditions. When reacted for a long time at high temperatures, moreover, the film discolors, detracting from its appearance, so improvements are required for purposes of food packaging.

Since a composition of polyvinyl alcohol and poly(meth)acrylic acid requires a long-term reaction at high temperatures to achieve esterification, methods have been proposed of adding an isocyanate compound or other crosslinking component to the polyacrylic acid (see for example Japanese Patent Application Laid-open No. 2001-310425, Claim 1, Example 1) or further reacting it with metal ions (see for example Japanese Patent Application Laid-open No. 2003-171419, Claim 1, Table 1), but even these methods require high-temperature treatment for 5 minutes at 180 to 200° C. as described in the Examples in order to crosslink the polyacrylic acid with the crosslinking component.

Other means that have been proposed for solving the problems of prior art include a method of laminating polyvinyl alcohol with gas barrier properties on a metal oxide thin film (see for example Japanese Patent Application Laid-open No. H6-316025, Claim 1), a laminated film comprising a deposited layer of an inorganic compound coated on the surface with a coating agent consisting mainly of a an aqueous solution or mixed water/alcohol solution of a water-soluble polymer and at least one of (a) one or more alkoxides and/or hydrolysates thereof and (b) tin chloride (Japanese Patent Publication 2790054, Claim 1), a laminated film obtained by applying a coating composition consisting of a specific organosilane, a silyl group-containing fluorine polymer and an organopolysiloxane (Japanese Patent Application Laid-open No. 2000-63752, Claim 7, Claim 11), and a gas barrier coating film obtained by applying a coating agent comprising a polyvinyl alcohol resin and a metal alcoholate (Japanese Patent Application Laid-open No. 2002-173631, Claim 1, Claim 11). However, gas barrier films obtained by laminating polyvinyl alcohol may have lower oxygen barrier properties under high humidity conditions, while a composition of ethylene-vinyl alcohol copolymer and poly(meth)acrylic acid requires high-temperature treatment for 5 minutes at 180° C. to 200° C. in order to obtain barrier properties under high humidity conditions.

DISCLOSURE OF THE INVENTION

It is therefore an object of the present invention to provide a gas-barrier film with excellent gas barrier properties under high humidity conditions without crosslinking of the unsaturated carboxylic acid compound under high-temperature conditions of 180° C. to 200° C., along with a gas-barrier layered body and a manufacturing method therefor.

The composition of the present invention comprises the following features.

That is, the present invention provides a gas-barrier film comprising a polymer (A) of a polyvalent metal salt of an unsaturated carboxylic acid compound which gives an infrared absorption spectrum in which the ratio of the absorbance $A_0$ at around 1,700 $cm^{-1}$ attributable to the $vC=O$ of the carboxylic acid groups to the absorbance A at around 1,520 $cm^{-1}$ attributable to the $vC=O$ of the carboxylate ions, $A_0/A$, is lower than 0.25.

The present invention also provides the aforementioned gas-barrier film wherein polymer (A) is a copolymer (A1) comprising 50% mole or less of a univalent metal salt of an unsaturated carboxylic acid compound.

The present invention also provides the aforementioned gas-barrier film wherein polymer (A) is a copolymer (A2) comprising 50% or less by weight of a polyvalent unsaturated carboxylic acid ester.

The present invention also provides the aforementioned gas-barrier film wherein polymer (A) is a polymer (A3) comprising 50% or less by weight of a water-soluble polymer (B).

The present invention also provides the aforementioned gas-barrier film wherein the polyvalent metal is at least one selected from Mg, Ca, Zn, Ba and Al.

The present invention also provides the aforementioned gas-barrier film wherein the unsaturated carboxylic acid compound is (meth)acrylic acid.

The present invention also provides a gas-barrier layered body obtained by forming the aforementioned gas-barrier film on at least one side of a substrate layer (C).

The present invention also provides the aforementioned gas-barrier layered body wherein substrate layer (C) is a film substrate (C1).

The present invention also provides the aforementioned gas-barrier layered body wherein substrate layer (C) has an inorganic compound deposition layer (D) formed thereon.

The present invention also provides the aforementioned gas-barrier layered body wherein inorganic compound deposition layer (D) is layered on at least one gas-barrier film formed on at least one side of substrate layer (C).

The present invention also provides the aforementioned gas-barrier layered body wherein substrate layer (C) is hollow body (C2).

The present invention also provides a method for manufacturing a gas-barrier film or gas-barrier layered body, wherein a solution of a polyvalent metal salt of an unsaturated carboxylic acid compound having a degree of polymerization lower than 20 is applied to at least one side of a substrate or substrate layer (C), and the polyvalent metal salt of an unsaturated carboxylic acid compound is then polymerized.

The present invention also provides a method for manufacturing a gas-barrier film or gas-barrier layered body, wherein a solution comprising an unsaturated carboxylic acid compound having a degree of polymerization lower than 20 and a polyvalent metal compound is applied to at least one side of a substrate or substrate layer (C), and the polyvalent metal salt of an unsaturated carboxylic acid compound is then polymerized.

The present invention also provides the aforementioned method for manufacturing a gas-barrier film or gas-barrier layered body, wherein the solution comprises at least one of 50% mole or less of a univalent metal salt of an unsaturated carboxylic acid compound, 50% or less by weight of a polyvalent unsaturated carboxylic ester and 50% or less by weight of a water-soluble polymer (B).

The present invention also provides the aforementioned method for manufacturing a gas-barrier film or gas-barrier layered body, wherein the unsaturated carboxylic acid compound is an unsaturated carboxylic acid monomer or polymer with a degree of polymerization of 10 or less.

The present invention also provides the aforementioned method for manufacturing a gas-barrier film or gas-barrier layered body, wherein the unsaturated carboxylic acid compound is (meth)acrylic acid.

The present invention also provides the aforementioned method for manufacturing a gas-barrier film or gas-barrier layered body, wherein the solution is an aqueous solution.

The present invention also provides the aforementioned method for manufacturing a gas-barrier film or gas-barrier layered body, wherein the polyvalent metal salt of an unsaturated carboxylic acid compound is polymerized in the presence of moisture.

The present invention also provides the aforementioned method for manufacturing a gas-barrier layered body, wherein substrate layer (C) is a film substrate (C1).

The present invention also provides the aforementioned method for manufacturing a gas-barrier layered body, wherein substrate layer (C) is a film substrate (C3) with an inorganic compound deposition layer (D) formed thereon.

The present invention also provides the aforementioned method for manufacturing a gas-barrier layered body, wherein substrate layer (C) is a hollow body (C2).

The present invention also provides a gas-barrier film or gas-barrier layered body obtained by the aforementioned manufacturing methods.

BEST MODE FOR CARRYING OUT THE INVENTION (Unsaturated Carboxylic Acid Compound)

The unsaturated carboxylic acid compound of the present invention is a carboxylic acid compound such as acrylic acid, methacrylic acid, maleic acid or itaconic acid having an α,β-ethylene unsaturated group, and is a polymer with a degree of polymerization of less than 20 or preferably a monomer or polymer with a degree of polymerization of 10 or less. This is because a film obtained by polymerizing a salt of a polymer (polymer compound) with a degree of polymerization over 20 with a polyvalent metal compound does not have good gas barrier properties under high humidity conditions.

Of these unsaturated carboxylic acid compounds, a monomer is preferred because it easily forms a salt which is entirely neutralized by the polyvalent metal compound, and a film obtained by polymerizing this salt has excellent gas barrier properties.

(Polyvalent Metal Compound)

The polyvalent metal compound of the present invention is specifically a bivalent or higher metal such as magnesium (Mg), calcium (Ca), barium (Ba), zinc (Zn), copper (Cu), cobalt (Co), nickel (Ni), aluminum (Al), iron (Fe) or the like, or an oxide, hydroxide, halide, carbonate, phosphate, phosphite, hypophosphite, sulfate or sulfite of one of these metals. Of these metal compounds, a bivalent metal compound is desirable, and magnesium oxide, calcium oxide, barium oxide, zinc oxide, magnesium hydroxide, calcium hydroxide, barium hydroxide, zinc hydroxide or the like is particularly desirable. When these bivalent metal compounds are used, a film obtained by polymerization of a salt thereof with the aforementioned unsaturated carboxylic compound has particularly good gas barrier properties under high humidity conditions. At least one of these is used, and only one can be used or two or more can be used in combination.

(Univalent Metal Compound)

The univalent metal compound which is one component forming the copolymer (A1) of the present invention is an alkali metal of the 1A group of the periodic table or a metal compound thereof, and specifically may be a univalent metal such as lithium (Li), sodium (Na) or potassium (K), or an oxide, hydroxide, halide, carbonate, phosphate, phosphite, hypophosphite, sulfate or sulfite of one of these, with specific examples including sodium oxide, potassium oxide, sodium hydroxide and potassium hydroxide. When these univalent metal compounds are used, a film obtained by copolymerization with the aforementioned polyvalent metal salt of an unsaturated carboxylic acid compound has particularly good gas barrier properties under high humidity conditions. At least one such univalent metal compound is used, and only one may be used or two or more may be used in combination. Of these polyvalent metal compounds, Na and K are particularly desirable.

(Polyvalent Metal Salt of Unsaturated Carboxylic Acid Compound)

The polyvalent metal salt of an unsaturated carboxylic acid compound which is the base for polymer (A) of a polyvalent metal salt of an unsaturated carboxylic acid compound of the present invention is a salt of the aforementioned unsaturated carboxylic acid compound with a degree of polymerization of less than 20 and the aforementioned polyvalent metal compound. One such polyvalent metal salt of an unsaturated carboxylic acid compound can be used, or a mixture of two or more may be used. Of these unsaturated carboxylic acid compound polyvalent metal salts, zinc (meth)acrylate is desirable for obtaining excellent hot water resistance of the resulting copolymer layer.

(Univalent Metal Salt of Unsaturated Carboxylic Acid Compound)

The univalent salt of an unsaturated carboxylic acid compound which is the basis for copolymer (A1) of metal salts of unsaturated carboxylic acid compounds of the present invention is a salt of the aforementioned unsaturated carboxylic acid compound with a degree of polymerization of less than 20 and the aforementioned univalent metal compound. One such unsaturated carboxylic acid compound univalent metal salt may be used, or a mixture of two or more may be used.

When this univalent metal salt of an unsaturated carboxylic acid compound is used, a gas-barrier film comprising the resulting copolymer (A1) has excellent anti-static properties. The greater the added amount of the univalent metal salt, the greater the anti-static properties.

Of these univalent metal salts of unsaturated carboxylic acid compounds, potassium (meth)acrylate is desirable for obtaining excellent anti-static properties of a gas-barrier film of the resulting copolymer (A1).

(Polyvalent Unsaturated Carboxylic Acid Ester)

This polyvalent unsaturated carboxylic acid ester which is one component making up copolymer (A2) of the gas-barrier film of the present invention is an ester and preferably a polyvalent ester of an unsaturated carboxylic acid compound and a polyvalent alcohol.

Specific examples of unsaturated carboxylic acid compounds include acrylic acid, methacrylic acid, maleic acid, itaconic acid and other carboxylic acid compounds having α,β-ethylene unsaturated groups, but are not limited to these. Of these unsaturated carboxylic acid compounds, acrylic acid and methacrylic acid are preferred.

Specific examples of polyvalent alcohols include ethylene glycol, diethylene glycol, triethylene glycol, neopentyl glycol, 1,4-butanediol, 1,6-hexanediol, 1,9-nonanediol, 1,10-decanediol, 3-methyl-1,5-pentanediol, 2-butyl-2-ethyl-1,3-propanediol and other alkylene glycols, polyoxyethylene glycol with a molecular weight in the range of 50 to 3000, polyoxypropylene glycol, polyoxytetramethylene glycol and other polyalkylene glycols and other bivalent alcohols, and glycerin, trimethylol propane, pentaerythritol and other tri- and tetravalent polyvalent alcohols, but are not limited to these.

The polyvalent unsaturated carboxylic acid ester of the present invention is an ester and preferably a polyvalent ester of the aforementioned unsaturated carboxylic acid compound and polyvalent alcohol, and specific examples include ethylene glycol diacrylate, diethylene glycol diacrylate, triethylene glycol diacrylate, PEG #200 diacrylate, PEG #400 diacrylate, PEG #600 diacrylate, neopentyl glycol diacrylate, 1,4-butanediol diacrylate, 1,6-hexanediol diacrylate, 1,9-nonanediol diacrylate, 1,10-decanediol diacrylate, 3-methyl-1,5-pentanediol diacrylate, 2-butyl-2-ethyl-1,3-propanediol diacrylate and other acrylic acid bivalent esters of glycols; glycerin diacrylate and other acrylic acid bivalent esters of polyvalent alcohols; ethylene glycol dimethacrylate, diethylene glycol dimethacrylate, triethylene glycol dimethacrylate, PEG #200 dimethacrylate, PEG #400 dimethacrylate, PEG #600 dimethacrylate, neopentyl glycol dimethacrylate, 1,4-butanediol dimethacrylate, 1,6-hexanediol dimethacrylate, 1,9-nonanediol dimethacrylate, 1,10-decanediol dimethacrylate, 3-methyl-1,5-pentanediol dimethacrylate, 2-butyl-2-ethyl-1,3-propanediol dimethacrylate and other methacrylic acid bivalent esters of glycols; glycerin dimethacrylate, trimethylolpropane trimethacrylate and other methacrylic acid polyvalent esters of polyvalent alcohols; and phthalic acid bis[2-hydroxy-3-[(1-oxo-2-propenyl)]oxy]propyl ester, acrylic acid denatured glycerin polyglycidyl ether, bis(acryloyloxyethyl)hydroxyethyl-isocyanurate and the like, but are not limited to these.

Of these polyvalent unsaturated carboxylic acid esters, a water-soluble polyvalent unsaturated carboxylic acid ester is desirable because it provides a water-soluble coating, and of these PEG #200 diacrylate, PEG #400 diacrylate, PEG #600 diacrylate and others having introduced polyethylene glycol are preferred.

(Water-Soluble Polymer (B))

The water-soluble polymer (B) which is one component making up the polymer (A3) of a polyvalent metal salt of an unsaturated carboxylic acid compound in the gas-barrier film of the present invention comprising 50% or less by weight of a water-soluble polymer (B) may be a natural water-soluble polymer such as starch, gum arabic or a polysaccharide, a cellulose derivative such as methylcellulose, ethylcellulose or carboxymethylcellulose, a semi-synthetic water-soluble polymer such as denatured starch, a vinyl alcohol polymer such as polyvinyl alcohol or ethylene-vinyl alcohol copolymer, or a synthetic water-soluble polymer such as polyvinylpyrrolidone, polyvinyl ethyl ether, polyacrylamide, polyethyleneimine or the like.

Of these water-soluble polymers, starch, polysaccharides and cellulose derivatives and hydroxyl-containing polymers such as vinyl alcohol polymers having hydroxyl groups in the molecule are desirable for improving the gas barrier properties under conditions of low humidity.

In particular, vinyl alcohol polymers such as polyvinyl alcohol and ethylene-vinyl alcohol copolymer not only provide improved gas barrier properties under conditions of low humidity, but are also desirable because they do not detract from the gas barrier properties under high-humidity conditions in a film comprising a polymer of a polyvalent metal salt of an unsaturated carboxylic acid compound.

(Gas-Barrier Film)

The first mode of the gas-barrier film of the present invention is a film obtained by polymerization of the aforementioned polyvalent metal salt of an unsaturated carboxylic acid compound, and comprises a polymer (A) of a polyvalent metal salt of an unsaturated carboxylic acid compound which gives an infrared absorption spectrum in which the ratio of the absorbance $A_0$ at around 1,700 $cm^{-1}$ attributable to the $vC=O$ of the carboxylic acid group to the absorbance A at around 1,520 $cm^{-1}$ attributable to the $vC=O$ of the carboxylate ion, ($A_0/A$), is lower than 0.25 and preferably lower than 0.20.

A gas-barrier film comprising polymer (A) of a polyvalent metal salt of an unsaturated carboxylic acid compound includes both free carboxylic acid and carboxylate ions formed by ion crosslinking of the carboxylic acid groups and polyvalent metal, and in the infrared absorbance spectrum the absorbance attributable to the $vC=O$ of the free carboxylic acid groups is about 1,700 $cm^{-1}$ while the absorbance attributable to the $vC=O$ of the carboxylate ions is around 1520 $cm^{-1}$.

Consequently, in the gas-barrier film of the present invention an ($A_0/A$) ratio of less than 0.25 means that there are either very few or no free carboxylic acid groups, while in a film with an ($A_0/A$) ratio over 0.25 the content of carboxylic acid groups is higher, and the gas barrier properties under conditions of high humidity are not improved.

In the present invention, the ratio ($A_0/A$) of the absorbance $A_0$ at around 1,700 $cm^{-1}$ attributable to the $vC=O$ of the carboxylic acid groups to the absorbance A at around 1,520 $cm^{-1}$ attributable to the $vC=O$ of the carboxylate ions in the infrared absorbance spectrum was measured by cutting out a 1 cm×3 cm measurement sample from the gas-barrier film (gas-barrier layered body), obtaining the infrared absorbance spectrum of the surface (layer of polyvalent metal salt of unsaturated carboxylic acid compound) by infrared total reflectance measurement (ATR), and deriving absorbance $A_0$ and absorbance A by the following procedures.

Absorbance $A_0$ at around 1,700 $cm^{-1}$ attributable to the $vC=O$ of the carboxylic acid groups: The absorbance values at 1660 $cm^{-1}$ and 1760 $cm^{-1}$ in the infrared absorbance spectrum were connected with a straight line (N), a straight line (O) was drawn vertically down from the maximum absorbance (near 1700 cm$^{-1}$) between 1660 and 1760 cm$^{-1}$ and the distance (length) in absorbance between the intersection of straight line (O) and straight line (N) and the maximum absorbance was given as absorbance $A_0$.

Absorbance A at around 1,520 cm$^{-1}$ attributable to the vC=O of the carboxylate ions: The absorbance values at 1480 cm$^{-1}$ and 1630 cm$^{-1}$ in the infrared absorbance spectrum were connected with a straight line (L), a straight line (M) was drawn vertically down from the maximum absorbance (near 1520 cm$^{-1}$) between 1480 and 1630 cm$^{-1}$, and the distance (length) in absorbance between the intersection of straight line (M) and straight line (L) and the maximum absorbance was given as absorbance A. The peak position of the maximum absorbance (near 1520 cm$^{-1}$) varies depending on the metal species of the counter-ions, and is for example near 1520 cm$^{-1}$ in the case of calcium, near 1520 cm$^{-1}$ in the case of zinc, near 1540 cm$^{-1}$ in the case of magnesium and near 1540 cm$^{-1}$ in the case of sodium (Na).

Next, the ratio ($A_0/A$) was derived from the absorbance values $A_0$ and A obtained by the aforementioned methods.

In the present invention, infrared spectrum measurement (attenuated total reflectance: ATR) was performed under conditions of incidence angle 45°, room temperature, resolution 4 cm$^{-1}$, times 150 using a Jasco FT-IR350 mounted with a KRS-5 (Thallium Bromide-Iodide) crystal.

The second mode of the gas-barrier film of the present invention is a gas-barrier film wherein the polymer (A) of the aforementioned first mode is a copolymer (A1) of the aforementioned polyvalent metal salt of an unsaturated carboxylic acid compound with 50% mole or less or preferably 40% mole or less or more preferably 30% mole or less of a univalent metal salt of an unsaturated carboxylic acid compound (with the total of the univalent metal salt of an unsaturated carboxylic acid compound and the polyvalent metal salt of an unsaturated carboxylic acid compound equaling 100% mole).

The gas-barrier film of the second mode of the present invention comprises copolymer (A1) of a polyvalent metal salt of an unsaturated carboxylic acid compound and a univalent metal salt of an unsaturated carboxylic acid compound, wherein the ratio ($A_0/A$) of the absorbance $A_0$ at around 1,700 cm$^{-1}$ attributable to the vC=O of the carboxylic acid groups to the absorbance A at around 1,520 cm attributable to the vC=O of the carboxylate ions in the infrared absorbance spectrum is less than 0.25 or preferably less than 0.20.

This is because the gas barrier properties and in particular the gas barrier properties (oxygen barrier properties) under conditions of high humidity are adversely affected if the content of the univalent metal salt of an unsaturated carboxylic acid compound in the film exceeds 50% mole.

Moreover, a gas-barrier film obtained by co-polymerization of a univalent metal salt of an unsaturated carboxylic acid compound has a lower surface resistivity value than the aforementioned film obtained by polymerization of a polyvalent metal salt of an unsaturated carboxylic acid compound, providing a gas-barrier film with superior anti-static properties, and the anti-static properties are greater the greater the added amount of the univalent salt of an unsaturated carboxylic acid compound.

When potassium (K) is used for the univalent metal salt of the unsaturated carboxylic acid compound, moreover, the resulting gas-barrier film also has a lower surface resistivity and superior anti-static properties.

A gas-barrier film of the present invention comprising a copolymer (A1) of a univalent metal salt and a polyvalent metal salt of an unsaturated carboxylic acid compound includes free carboxylic acid groups as well as carboxylate ions formed by ion crosslinking of carboxylic acid groups with both the polyvalent metal and the univalent metal, with an absorbance at around 1700 cm$^{-1}$ attributable to the vC=O of the free carboxylic acid groups and an absorbance at around 1,520 cm$^{-1}$ attributable to the vC=O of the carboxylate ions.

The gas-barrier film of the third mode of the present invention comprises a copolymer (A2) of the aforementioned polyvalent metal salt of an unsaturated carboxylic acid compound with a polyvalent unsaturated carboxylic acid ester, wherein the ratio ($A_0/A$) of the absorbance $A_0$ at around 1,700 cm$^{-1}$ attributable to the vC=O of the carboxylic acid groups to the absorbance A at around 1,520 cm$^{-1}$ attributable to the vC=O of the carboxylate ions in the infrared absorbance spectrum is less than 0.25 or preferably less than 0.20.

A gas-barrier film (A2) comprising a polyvalent unsaturated carboxylic acid ester as a copolymerization component is tougher (has greater elongation) than a film obtained by polymerization of the aforementioned polyvalent metal salt of an unsaturated carboxylic acid compound. If the content of the polyvalent unsaturated carboxylic ester exceeds 50% by weight, however, the gas barrier properties and particularly the gas barrier properties (oxygen barrier properties) under high humidity conditions will be adversely affected.

The fourth mode of the gas-barrier film of the present invention is a gas-barrier film in which polymer (A) in the aforementioned first mode is polymer (A3) comprising the aforementioned polyvalent metal salt of an unsaturated carboxylic acid compound along with 50% or less or preferably 40% or less or more preferably 30% or less by weight of water-soluble polymer (B).

The fourth mode of the gas-barrier film of the present invention comprises a copolymer (A3) containing a water-soluble polymer (B) and the aforementioned polyvalent metal salt of an unsaturated carboxylic acid compound, wherein the ratio ($A_0/A$) of the absorbance $A_0$ at around 1,700 cm$^{-1}$ attributable to the vC=O of the carboxylic acid groups to the absorbance A at around 1,520 cm$^{-1}$ attributable to the vC=O of the carboxylate ions in the infrared absorbance spectrum is less than 0.25 or preferably less than 0.20.

A gas-barrier film containing a water-soluble polymer (B) has better gas barrier properties under low-humidity conditions than a film obtained by polymerization of the aforementioned polyvalent metal salt of an unsaturated carboxylic acid compound, and also has toughness (elongation). If the content of the water-soluble polymer (B) in the film exceeds 50% by weight, however, the gas barrier properties and in particular the gas barrier properties (oxygen barrier properties) under high-humidity conditions will be adversely affected.

In addition to the aforementioned water-soluble polymer (B), the gas-barrier film of the present invention may also include acrylic acid ester polymer, ethylene-acrylic acid copolymer, vinyl polyacetate, ethylene-vinyl acetate copolymer, polyester, polyurethane and other high-molecular-weight compounds (polymers) to the extent that these do not detract from the object of the present invention.

Moreover, the unsaturated carboxylic acid compound that forms the gas-barrier film of the present invention may also include, in addition to the aforementioned polyvalent unsaturated carboxylic acid ester, methyl (methacrylate, ethyl (meth)acrylate and other acrylic acid ester compounds, vinyl acetate and other vinyl ester compounds, and ethylene and other olefin compounds and the like to the extent that these do not detract from the object of the present invention.

(Gas-Barrier Film Layered Body)

The first mode of the gas-barrier layered body of the present invention is a gas-barrier layered body obtained by layering a gas-barrier film comprising a polymer (A) of a polyvalent metal salt of an unsaturated carboxylic acid compound wherein the ratio ($A_0/A$) of the absorbance $A_0$ at around 1,700 $cm^{-1}$ attributable to the $vC=O$ of the carboxylic acid groups to the absorbance A at around 1,520 $cm^{-1}$ attributable to the $vC=O$ of the carboxylate ions in the infrared absorbance spectrum is less than 0.25 or preferably less than 0.20.

The second mode of the gas-barrier layered body of the present invention is a gas-barrier layered body wherein the polymer (A) of the aforementioned first mode is a copolymer (A1) with 50% mole or less of a univalent metal salt of an unsaturated carboxylic acid compound.

The third mode of the gas-barrier layered body of the present invention is a gas-barrier layered body wherein the polymer (A) of the aforementioned first mode is a copolymer (A2) with 50% or less by weight of a polyvalent unsaturated carboxylic acid ester.

The fourth mode of the gas-barrier layered body of the present invention is a gas-barrier layered body wherein the polymer (A) of the aforementioned first mode is a polymer (A3) comprising 50% or less by weight of a water-soluble polymer (B).

In another mode of the gas-barrier layered body of the present invention, substrate layer (C) (discussed below) is a substrate layer having inorganic compound deposition layer (D) formed on at least one side of substrate layer (C), with the aforementioned gas-barrier film being formed on at least one side of this inorganic compound deposition layer (D) in the layered body. By using a substrate layer with this inorganic compound deposition layer (D) formed thereon, it is possible to confer vapor-proofing properties on the gas-barrier layered body.

Another mode of the gas-barrier layered body of the present invention is a gas-barrier layered body having inorganic compound deposition layer (D) (discussed below) formed on at least one side of the gas-barrier film forming the aforementioned gas-barrier layered body. By forming inorganic compound deposition layer (D) on the gas-barrier film it is possible to confer vapor-proofing properties on the gas-barrier layered body.

The gas-barrier layered body of the present invention may be in a variety of known forms such as a layered film, hollow body, tray or the like depending on the form of the substrate layer (C) (discussed below) and the intended use.

There are no particular limits on the thickness of the gas-barrier layered body of the present invention, which may be determined variously according to the intended use, but the thickness of substrate layer (C) is normally 5 to 1500 µm or preferably 5 to 500 µm or more preferably 9 to 100 µm or ideally 9 to 30 µm, while when inorganic compound deposition layer (D) is present the thickness of deposition layer (D) is 15 to 5000 Å or preferably 15 to 1000 Å or more preferably 230 to 450 Å, the thickness of the gas-barrier film (which may be a polymer layer (A) of a polyvalent metal salt of an unsaturated carboxylic acid compound) is 0.01 to 100 µm or preferably 0.05 to 50 µm or more preferably 0.1 to 10 µm, and the thickness of the gas-barrier layered body as a whole is 5 to 1600 µm or preferably 5 to 550 µm or more preferably 10 to 150 µm or ideally 10 to 40 µm.

(Substrate Layer (C))

Substrate layer (C) for forming the aforementioned gas-barrier layered body of the present invention may be a sheet or film of thermosetting or thermoplastic resin (C1) or a hollow body (C2), and may take a variety of forms such as a cup, tray or the like, or may consist of paper, aluminum foil or the like.

A variety of known thermosetting resins may be used, including epoxy resin, unsaturated polyester resin, phenol resin, urea-melamine resin, polyurethane resin, silicone resin and polyimide resin.

A variety of known thermoplastic resins may be used, including polyolefins (polyethylene, polypropylene, poly 4-methyl 1-pentene, polybutene, etc.), polyesters (polyethylene terephthalate, polybutylene terephthalate, polyethylene naphthalate, etc.), polyamides (nylon-6, nylon-66, polymetaxylene adipamide, etc.), polyvinyl chloride, polyimide, ethylene-vinyl acetate copolymer or saponificate, polyvinyl alcohol, polyacrylonitrile, polycarbonate, polystyrene, ionomer and mixtures of these and the like. Of these, thermoplastic resins such as polypropylene, polyethylene terephthalate, polyimide and the like having good drawing properties and transparency are preferred.

Inorganic compound deposition layer (D) may be formed on the surface of substrate layer (C).

There are no particular limits on the inorganic compound to be deposited on the surface of substrate layer (C) or the surface of the gas-barrier film as long as it is an inorganic compound suited to vapor deposition, but specific examples include metals such as chromium (Cr), zinc (Zn), cobalt (Co), aluminum (Al), tin (Sn) and silicon (Si) and oxides, nitrides, sulfides and phosphides of these metals and the like. Of these inorganic compounds, the oxides and particularly aluminum oxide, zinc oxide, silica (silicon oxide) and other oxides are desirable because they provide good transparency.

Methods of forming this inorganic compound deposition layer (D) on the surface of substrate layer (C) or the surface of the gas-barrier film include chemical vapor deposition (CVD), low-pressure CVD, plasma CVD and other chemical deposition methods, vacuum deposition (reactive vacuum deposition), sputtering (reactive sputtering), ion plating (reactive ion plating) and other forms of physical vapor deposition (PVD), and low-pressure plasma spraying, plasma spraying and other plasma spraying methods.

In order to improve adhesiveness with the gas-barrier film, the surface of this substrate layer (C) may be surface activated by for example corona treatment, flame treatment, plasma treatment, undercoat treatment, primer coat treatment or the like.

(Method for Manufacturing Gas-Barrier Film and Gas-Barrier Layered Body)

The method for manufacturing a gas-barrier film and gas-barrier layered body of the present invention (hereunder sometimes called "method for manufacturing a gas-barrier film or the like) is a method for manufacturing a gas-barrier layered body by applying a solution of a polyvalent metal salt of an unsaturated carboxylic acid compound to at least one side of a substrate, and then polymerizing the polyvalent metal salt of an unsaturated carboxylic acid compound.

In the method for manufacturing a gas-barrier film or the like of the present invention, the gas-barrier layered body of the specifications of the application having a gas-barrier film layered on at least one side can be obtained using the aforementioned substrate layer (C) as the substrate. A single-layer gas-barrier film of the present invention can also be obtained using the aforementioned substrate layer (C) or a glass, ceramic, metal or other inorganic substance or other material as the substrate by peeling off the substrate a polymer (A) obtained by polymerizing a polyvalent metal salt of an unsaturated carboxylic acid compound or the like.

When manufacturing the gas-barrier film or the like of the present invention, the unsaturated carboxylic acid compound and polyvalent metal compound can be first reacted to obtain a polyvalent metal salt of an unsaturated carboxylic acid compound, which is then made into a solution, or the unsaturated carboxylic acid compound and polyvalent metal compound can be directly dissolved together in a solvent to obtain a solution of a polyvalent metal salt.

In the method for manufacturing a gas-barrier film or the like of the present invention, when the unsaturated carboxylic acid compound and polyvalent metal compound are directly dissolved together in a solvent, or in other words when using a solution comprising the unsaturated carboxylic acid compound and polyvalent metal compound, the polyvalent metal compound is preferably added in an amount exceeding 0.3 chemical equivalents of the unsaturated carboxylic acid compound. When using a mixed solution in which the added amount of the polyvalent metal compound is 0.3 chemical equivalents or less, the resulting layered body will contain a large amount of free carboxylic acid groups, resulting in a layered body with poor gas-barrier properties. Although there is no particular upper limit on the added amount of the polyvalent metal compound, since more unreacted polyvalent metal compound remains when the added amount of the polyvalent metal compound exceeds one chemical equivalent, 5 or fewer chemical equivalents or more preferably 2 or fewer chemical equivalents are normally sufficient.

Moreover, when using a mixed solution of the unsaturated carboxylic acid compound and polyvalent metal compound, a polyvalent metal salt of the unsaturated carboxylic acid compound forms as the unsaturated carboxylic acid compound and polyvalent metal compound are being dissolved in the solvent, but they should be mixed for at least one minute to ensure formation of the polyvalent metal salt.

The solvent used for the solution of the polyvalent metal salt of an unsaturated carboxylic acid compound or the like may be water or an organic solvent such as acetone or lower alcohol such as methyl alcohol, ethyl alcohol or isopropyl alcohol, or methyl ethyl ketone or the like or a mixed solvent of these, but water is most preferred.

There are no particular limits on the method of applying the polyvalent metal salt of an unsaturated carboxylic acid compound or the like to at least one side of substrate layer (C) or the like, and a variety of known methods may be adopted. Specific examples include dipping substrate layer (C) or the like in the solution and spraying the solution on the surface of substrate layer (C) or the like, or it may be applied using an air knife coater, direct gravure coater, gravure offset, arc gravure coater, gravure reverse, jet nozzle system or other gravure coater, a top feed reverse coater, bottom feed reverse coater, nozzle feed reverse coater or other reverse coater, or a 5-roll coater, lip coater, bar coater, bar reverse coater, dye coater or any other known coater in the amount of 0.05 to 10 g/m$^2$ or preferably 0.1 to 5 g/m$^2$ as solids in a solution of the polyvalent metal salt of an unsaturated carboxylic acid compound.

As discussed above, a gas-barrier film or gas-barrier layered body with improved anti-static properties, toughness (elongation), or toughness (elongation) and gas-barrier properties under low-humidity conditions can be obtained if at least one of 50% mole or less of a univalent metal salt of an unsaturated carboxylic acid compound, 50% or less by weight of a polyvalent unsaturated carboxylic acid ester and 50% or less by weight of a water-soluble polymer (B) is dissolved when dissolving the polyvalent metal salt of an unsaturated carboxylic acid compound or when dissolving the unsaturated carboxylic acid compound and polyvalent metal compound together.

In addition to the aforementioned compounds, a monomer or low-molecular-weight compound such as methyl (meth) acrylate, ethyl (meth)acrylate or another unsaturated carboxylic acid ester compound or vinyl acetate or another vinyl ester compound or the like or a high-molecular-weight compound (polymer) such as an acrylic acid ester polymer, ethylene-acrylic acid copolymer, vinyl polyacetate, ethylene-vinyl acetate copolymer, polyester, polyurethane or the like can also be added when dissolving the polyvalent metal salt of an unsaturated carboxylic acid compound or the like to the extent that this does not detract from the object of the present invention.

Various additives such as lubricants, slipping agents, anti-blocking agents, anti-static agents, anti-clouding agents, pigments, dyes and inorganic and organic fillers and the like can also be added when dissolving the polyvalent metal salt of an unsaturated carboxylic acid compound or when dissolving the unsaturated carboxylic acid compound and polyvalent metal compound to the extent that this does not detract from the object of the invention, and various surfactants and the like may also be added to improve wettability with substrate layer (C).

Methods of obtaining polymer (A) by polymerizing the polyvalent metal salt of an unsaturated carboxylic acid compound or the mixture of an unsaturated carboxylic acid compound and polyvalent metal compound applied to substrate layer (C) or the like include a variety of known methods, such as specifically methods using heating, exposure to ionizing radiation and the like.

When using ionizing radiation, there are no particular limits as long as the energy rays are in the wavelength range of 0.0001 to 800 nm, but examples include alpha rays, beta rays, gamma rays, x rays, visible rays, ultraviolet rays, electron rays and the like. Of these types of ionizing radiation, visible rays in the wavelength range of 400 to 800 nm, ultraviolet rays in the range of 50 to 400 nm and electron rays in the range of 0.01 to 0.002 are preferred because they are easy to handle and the equipment is easily available.

When using visible rays and ultraviolet rays as the ionizing radiation, a photopolymerization initiator needs to be added to the solution of the polyvalent metal salt of an unsaturated carboxylic acid compound or the like. A known photopolymerization initiator may be used, and examples include 2-hydroxy-2-methyl-1-phenyl-propan-1-one (Darocur 1173®, Chiba Specialty Chemicals), 1-hydroxy-cyclohexyl-phenylketone (Irgacure 184®, Chiba Specialty Chemicals), bis (2,4,6-trimethylbenzoyl)-phenylphosphineoxide (Irgacure 819®, Chiba Specialty Chemicals), 1-[4-(2-hydroxyethoxy)-phenyl]-2-hydroxy-2-methyl-1-propane-1-one (Irgacure 2959®, Chiba Specialty Chemicals), a mixture of alpha-hydroxyketone, acylphosphine oxide, 4-methylbenzophenone and 2,4,6-trimethylbenzophenone (Esacure KT046®, Lamberti Chemical Specialty), Esacure KT55 (Lamberti Chemical Specialty), 2,4,6-trimethylbenzoyl diphenylphosphine oxide (Speedcure TPO®, Lambson Fine Chemicals) and radical polymerization initiators manufactured and sold under other trademarks. A polymerization accelerator may also be added to increase the degree or speed of polymerization, and examples include N,N-dimethylamino-ethyl-(meth) acrylate, N-(meth)acryloyl-morphine and the like.

The polyvalent metal salt of an unsaturated carboxylic acid compound or the like may be polymerized in a solution containing water or another solvent or may be polymerized after partial drying, but when the applied solution contains a large amount of water or another solvent, the gas-barrier film may turn white if the solution is polymerized immediately after application. On the other hand, as the amount of solvent (moisture) decreases the polyvalent metal salt of an unsaturated carboxylic acid compound may precipitate, and if it is polymerized in this state the gas-barrier film will not form properly. That is, the resulting gas-barrier film may appear white, or its gas-barrier properties may be unstable. Therefore, it is preferable that the applied polyvalent metal salt of an unsaturated carboxylic acid compound be polymerized in a state containing a suitable amount of moisture.

The polyvalent metal salt of an unsaturated carboxylic acid compound or the like may be polymerized in one stage or in two or more stages, or in other words the main polymerization may be preceded by pre-polymerization.

A layered film suited as a heat-sealable packaging film can be obtained by laminating a heat-sealable layer on at least one side of the gas-barrier layered film of the present invention. Examples of such heat-sealable layers include layers obtained from ethylene, propylene, butene-1, hexene-1,4-methyl pentene-1, octane-1 and other alpha-olefins either as homopolymer or as copolymers, high-pressure method low-density polyethylene, linear low-density polyethylene (LLDPE), high-density polyethylene, polypropylene, polypropylene random copolymers, polybutene, poly-4-methyl pentene-1, low-crystalline or amorphous ethylene-propylene random copolymer and other polyolefins either alone or as compositions of two or more, ethylene-vinyl acetate copolymer (EVA), ethylene-(meth)acrylic acid copolymer and metal salts thereof, and compositions of EVA and polyolefins, which are commonly used in heat-sealable layers.

Of these, heat-sealable layers obtained from high-pressure method low-density polyethylene, linear low-density polyethylene (LLDPE), high-pressure polyethylene and other ethylene polymers are desirable because of their superior low-temperature heat-sealability and heat seal strength.

EXAMPLES

The present invention is explained in detail below using examples, but the present invention is not restricted by these examples as long as its intent is not exceeded.

The physical values in the examples and comparative examples were derived as follows.

(Evaluation Methods)

(1) Oxygen permeability [ml/($m^2 \cdot$day$\cdot$MPa)]: following 3 hours of adjustment to conditions of temperature 20° C., 90% RH or temperature 20° C., 50% RH using a Mocon Co. OX-TRAN 2/20 or OX-TRAN 2/21 mL in accordance with JIS K7126 (equal pressure method), this was measured after 3 hours of adjustment to conditions of temperature 20° C., humidity 0% RH using the same Mocon Co. OX-TRAN 2/20 in accordance with JIS K7126 (equal pressure method)

(2) Absorbance ratio ($A_0/A$) measurement: measured by the methods described above (3) Water vapor permeability [g/($m^2 \cdot$day)]: a multilayer film was folded over and heat sealed on two sides (linear low-density polyethylene film surfaces) to form a bag which was then filled with calcium chloride, the remaining side was then heat sealed to prepare a bag with a surface area of 0.01 $m^2$, this was left for 3 days under conditions of temperature 40° C., 90% RH, and water vapor permeability was measured based on the weight difference.

(4) Hot water resistance: a (layered) film was treated with 95° C. hot water for 30 minutes, and the oxygen permeability and water vapor permeability were measured.

(5) Surface resistivity: a (layered) film was left for 24 hours in a thermo-hygrostatic room at 23° C., 50% RH, and the surface resistivity of the copolymer layer surface was measured with an ultra-high resistance meter (Advantest R8340A) under conditions of temperature 23° C., 50% RH.

(6) Tensile characteristics: a (layered) film was stretched to a fixed extent at a speed of 50 mm/minute using a tensile tester (Orientec Inc. Tensilon Universal Tester RTC-1225) under conditions of temperature 23° C., humidity 50% RH, and the surface condition of the gas-barrier film was then observed under an optical microscope and evaluated as ○: no cracks, Δ: tiny cracks present, x: cracks present.

(7) Moisture content of solution (coat): a 10 cm×10 cm sample was quickly cut out from a layered film (film before polymerization by exposure to ultraviolet) obtained by applying a solution containing a polyvalent metal salt of an unsaturated carboxylic acid compound or the like to a substrate film and drying it under specific conditions with a hot-air dryer, and the weight of this sample was measured and given as B1. This sample was then dried for 10 minutes in a 100° C. oven, and its weight was again measured and given as B2. The film that had been weighed (as B2) was then water washed to remove the coat and dried for 10 minutes in a 100° C. oven, and its weight was again measured and given as B3. Using these values, the moisture content (%) of the coat before polymerization was calculated as (%)=[B1−B2)/(B1−B3)]×100.

Example 1

Preparation of Solution of Polyvalent Metal Salt of Unsaturated Carboxylic Acid Compound Acrylic acid (monomer, Kyoeisha Chemical Co., Ltd.) was diluted with water to prepare a 25% aqueous solution. Calcium hydroxide (Kanto Chemical Co., Inc.) was added in the amount of 1 chemical equivalent of the carboxyl groups of the acrylic acid in this aqueous solution to prepare an aqueous solution of calcium acrylate (acrylic acid calcium salt). Next, a photopolymerization initiator (Darocur 1173®, Chiba Specialty Chemicals) diluted to 25% with isopropyl alcohol was added in the amount of 2% (solids ratio) of the calcium acrylate aqueous solution to prepare a solution (coating liquid) of a polyvalent metal salt of an unsaturated carboxylic acid compound for forming a gas-barrier film.

Preparation of Gas-Barrier Layered Film

The prepared coating liquid was applied with a Meyer bar coater to a coating volume (as solids) of 3.5 g/$m^2$ on the corona-treated surface of a film substrate consisting of a 12 μm-thick biaxial oriented polyester film (Emblet® PET 12, Unitika), and dried at 60° C. for 12 seconds using a hot-air dryer. This moisture content of this coat was 33.5%. This was immediately fixed on a stainless steel plate with the coating surface facing up, and polymerized by exposure to ultraviolet rays under conditions of UV strength 190 mW/$cm^2$, cumulative light 250 mJ/$cm^2$ using a UV irradiator (Eye Graphics EYE GRANDAGE type ECS 301G1) to obtain a gas-barrier layered film.

The oxygen permeability and absorbance ratio ($A_0/A$) of the resulting gas-barrier layered film are shown in Table 1.

Example 2

A magnesium acrylate (magnesium salt of acrylic acid) aqueous solution was prepared by adding 1 chemical equivalent of magnesium oxide (Wako Pure Chemical Industries) in place of the calcium hydroxide used in Example 1, and a photopolymerization initiator was added to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

Example 3

Using a calcium acrylate (calcium salt of acrylic acid) aqueous solution (Asada Chemical, concentration 30%) in place of the calcium acrylate aqueous solution prepared in Example 1, a photopolymerization initiator was added followed by a surfactant (Emalgen 120®, Kao) as a wetting agent in the amount of 0.4% (solids ratio) of the calcium acrylate to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

Example 4

Using a zinc acrylate (zinc salt of acrylic acid) aqueous solution (Asada Chemical, concentration 30%) in place of the calcium acrylate aqueous solution used in Example 3, a gas-barrier layered film was obtained by the same methods as in Example 3.

The oxygen permeability and absorbance ratio ($A_0/A$) of the resulting gas-barrier layered film are shown in Table 1.

Example 5

A photopolymerization initiator was added to the calcium acrylate aqueous solution prepared in Example 1, and a 10% aqueous solution of ethylene-vinyl alcohol copolymer (PVAE, degree of polymerization 500, degree of saponification 98.5% mole, ethylene content 8.5% mole) was mixed in the amount of 10% (solids ratio) of the calcium acrylate to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

Example 6

1 chemical equivalent of zinc oxide (Kanto Chemical) was added in place of the calcium hydroxide used in Example 1 to prepare a 100% neutralized zinc acrylate aqueous solution, a photopolymerization initiator was added, and a 10% aqueous solution of polyvinyl alcohol (PVA, PVA235®, Kuraray) was mixed in the amount of 10% (solids ratio) of the zinc acrylate to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

Example 7

0.4 chemical equivalents of zinc oxide (Kanto Chemical) were added in place of the calcium hydroxide used in Example 1 to prepare a zinc acrylate aqueous solution containing acrylic acid, and a photopolymerization initiator was added to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

Comparative Example 1

Acrylic acid (Kyoeisha Chemical) was diluted with water to prepare a 25% aqueous solution. A photopolymerization initiator was added to this aqueous solution to prepare a coating liquid, and a gas-barrier layered film was obtained by the same methods as in Example 1.

The oxygen permeability and absorbance ratio ($A_0/A$) of the resulting gas-barrier layered film are shown in Table 1.

Comparative Example 2

1 chemical equivalent of sodium hydroxide (Wako Pure Chemical Industries) was added in place of the calcium hydroxide used in Example 1 to prepare a sodium acrylate (sodium salt of acrylic acid) aqueous solution, and a photopolymerization initiator was added to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

Comparative Example 3

Polyacrylic acid (Jurimer® AC10SL, average degree of polymerization 28, 40% aqueous solution, Nihon Junyaku) was diluted with water to prepare a 10% aqueous solution. 0.54 chemical equivalents of calcium hydroxide (Kanto Chemical) were added to and dissolved in this polyacrylic acid to obtain a coating liquid of an aqueous calcium-neutralized solution of polyacrylic acid.

This coating liquid was applied with a Meyer bar to a coating volume (as solids) of 3.5 g/m² on the corona-treated surface of a film substrate consisting of a 12 μm-thick biaxial oriented polyester film (Emblet® PET 12, Unitika), and dried with a hot-air dryer under conditions of 90° C., 30 seconds to obtain a gas-barrier layered film.

The oxygen permeability and absorbance ratio ($A_0/A$) of the resulting gas-barrier layered film are shown in Table 1.

When calcium hydroxide was added in the amount of 0.6 chemical equivalents of the polyacrylic acid in an effort to raise the level of neutralization, the calcium-neutralized polyacrylic acid precipitated in the aqueous solution, making it difficult to coat on the substrate.

Comparative Example 4

Polyacrylic acid (Jurimer® AC10L, average degree of polymerization 347, 40% aqueous solution, Nihon Junyaku) was diluted with water to prepare a 10% aqueous solution. Calcium hydroxide (Kanto Chemical) in the amount of 0.3 chemical equivalents of the polyacrylic acid was added to and dissolved in this aqueous solution to prepare a calcium-neutralized aqueous solution of polyacrylic acid, and a gas-barrier film was obtained by the same methods as in Comparative Example 3.

The oxygen permeability and absorbance ratio ($A_0/A$) of the resulting gas-barrier layered film are shown in Table 1.

When calcium hydroxide was added in the amount of 0.4 chemical equivalents of the polyacrylic acid in an effort to raise the level of neutralization, the calcium-neutralized polyacrylic acid precipitated in the aqueous solution, making it difficult to coat on the substrate.

Comparative Example 5

Polyacrylic acid (Jurimer® AC10L, average degree of polymerization 347, 40% aqueous solution, Nihon Junyaku)

was diluted with water to prepare a 10% aqueous solution. Magnesium hydroxide (Wako Pure Chemical) was added and dissolved in the amount of 0.6 chemical equivalents of the polyacrylic acid to prepare magnesium-neutralized polyacrylic acid, and a gas-barrier film was obtained by the same methods as in Comparative Example 3.

The oxygen permeability and absorbance ratio ($A_0/A$) of the resulting gas-barrier layered film are shown in Table 1.

When magnesium hydroxide was added in the amount of 0.7 chemical equivalents of the polyacrylic acid in an effort to raise the level of neutralization, the magnesium-neutralized polyacrylic acid precipitated in the aqueous solution, making it difficult to coat on the substrate.

Comparative Example 6

0.3 chemical equivalents of zinc oxide (Kanto Chemical) were added in place of the calcium hydroxide used in Example 1 to prepare a zinc acrylate aqueous solution containing acrylic acid, and a photopolymerization initiator was added to prepare a coating liquid. A gas-barrier layered film was obtained by the same methods as in Example 1 using this coating liquid.

The oxygen permeability and absorbance ratio ($A_0/A$) of the resulting gas-barrier layered film are shown in Table 1.

The oxygen permeability of the gas-barrier layered films obtained in Examples 1 to 7 and Comparative Examples 1 to 6 was measured using a Mocon OX-TRAN 2/20.

That is, since a monomer of an unsaturated carboxylic acid compound or a polyvalent metal salt of an unsaturated carboxylic acid compound with a degree of polymerization of less than 20 is highly soluble and highly water-soluble in particular even when 100% neutralized, it can be coated uniformly on a substrate layer, and a film obtained by polymerizing this coating layer is highly neutralized and has good gas-barrier properties even under conditions of high humidity.

However, as also described in known documents, when using a polyacrylic acid with a degree of polymerization over 20 the polyvalent metal salt of the polyacrylic acid precipitates when an effort is made to raise the degree of neutralization, so that the solution is not uniform and consequently a film consisting of a polymer of a highly-neutralized unsaturated carboxylic acid polyvalent metal salt cannot be obtained, and the resulting film has poor gas-barrier properties under conditions of high humidity.

The solutions (coating liquids) and water-soluble polymers used in the following examples are described below.

(Preparation of Solution (X-1))

A photopolymerization initiator (2-hydroxy-2-methyl-1-phenyl-propan-1-one, Chiba Specialty Chemicals, Darocur® 1173) diluted to 25% by weight with isopropyl alcohol and a surfactant (Emalgen 120®, Kao) were added in the amounts of 2% and 0.4% (solids ratio) of the acrylic acid to an aqueous solution (Asada Chemical, concentration 30% weight, acrylic

TABLE 1

| | Carboxylic acid component (av. degree of polymerization) | Metal compound | | Mixture | | Oxygen permeability | |
|---|---|---|---|---|---|---|---|
| | | Type | Amount (chem. equiv.) | Type | Wt % | ml/(m²/day/MPa) | $A_0/A$ |
| Ex. 1 | Acrylic acid | Ca(OH)$_2$ | 1.0 | | | 6 | 0.11 |
| Ex. 2 | Acrylic acid | MgO | 1.0 | | | 31 | 0.15 |
| Ex. 3 | Calcium acrylate | | | | | 6 | 0.01 |
| Ex. 4 | Zinc acrylate | | | | | 3 | 0.04 |
| Ex. 5 | Acrylic acid | Ca(OH)$_2$ | 1.0 | PVAE | 10 | 6 | 0.17 |
| Ex. 6 | Acrylic acid | ZnO | 1.0 | PVA | 10 | 6 | 0.08 |
| Ex. 7 | Acrylic acid | ZnO | 0.4 | | | 6 | 0.14 |
| CE 1 | Acrylic acid | | | | | 800 | 67.7 |
| CE 2 | Acrylic acid | NaOH | 1.0 | | | 690 | 0.001 |
| CE 3 | Polyacrylic acid (28) | Ca(OH)$_2$ | 0.5 | | | 100 | 0.48 |
| CE 4 | Polyacrylic acid (347) | Ca(OH)$_2$ | 0.3 | | | 235 | 0.82 |
| CE 5 | Polyacrylic acid (347) | MgO | 0.6 | | | 570 | 0.37 |
| CE 6 | Acrylic acid | ZnO | 0.3 | | | 135 | 0.31 |

As shown in Table 1, those layered films (Examples 1 to 7) having layers (gas-barrier films) consisting of polymers of unsaturated carboxylic acid compound polyvalent metal salts with absorbance ratios ($A_0/A$) under 0.25 or in other words with few free carboxylic acid groups exhibited good gas-barrier properties (low oxygen permeability) under high-humidity conditions.

On the other hand, those layered films (Comparative Examples 1, 3, 6) having layers (gas-barrier films) consisting of polymers of unsaturated carboxylic acid compound polyvalent metal salts with absorbance ratios ($A_0/A$) of 0.25 or more or in other words with many free carboxylic acid groups exhibited poor gas barrier properties with high oxygen permeability. Moreover, the layered film (Comparative Example 2) having a layer (gas-barrier film) consisting of a polymer of a univalent metal salt (sodium salt) of an unsaturated carboxylic acid compound also exhibited poor gas barrier properties with high oxygen permeability.

acid 20% weight, zinc 10% weight) of zinc acrylate (zinc salt of acrylic acid) to prepare unsaturated carboxylic acid compound Zn salt solution (X-1).

(Preparation of Solution (X-2))

A photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were added in the amounts of 2% and 0.4% (solids ratio) of the acrylic acid to an aqueous solution (Asada Chemical, concentration 30% weight, acrylic acid 20% weight, zinc 10% weight) of zinc acrylate (zinc salt of acrylic acid) to prepare unsaturated carboxylic acid compound Zn salt solution (X-2).

(Preparation of Solution Y-1)

Unsaturated carboxylic acid compound Ca salt solution (Y-1) was prepared in the same way as coating liquid (X-1) above except that a calcium acrylate (acrylic acid calcium salt) aqueous solution (Asada Chemical, concentration 30% weight, acrylic acid 23.5% weight, calcium 6.5% weight) was used for the unsaturated carboxylic acid salt.
(Preparation of Solution Y-2).

Acrylic acid (monomer, Kyoeisha) was diluted with water to prepare a 25% aqueous solution. Sodium hydroxide (Kanto Chemical) was added in the amount of 1 chemical equivalent of the carboxyl groups in the acrylic acid in the aqueous solution to prepare an aqueous solution of sodium acrylate (acrylic acid Na salt).

Next, a photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were added in the amounts of 2% and 0.4% (solids ratio) of the acrylic acid to the resulting aqueous solution of sodium acrylate to prepare unsaturated carboxylic acid compound Na salt solution Y-2.
(Preparation of Solution Y-3)

PEG #200 diacrylate (molecular weight 302, Kyoeisha, Light-Acrylate® 4EG-A) was diluted with a 1:1 (weight ratio) mixture of water and isopropyl alcohol to prepare a 30% weight solution.

Next, the resulting solution, a photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were mixed in the molar proportions of 98.5%, 1.2% and 0.3%, respectively, to prepare polyvalent unsaturated acrylic acid ester solution (Y-3).
(Preparation of Solution Z-1)

Acrylic acid (monomer, Kyoeisha) was diluted with water to prepare a 20% aqueous solution, and zinc oxide (Kanto Chemical) in the amount of 1 chemical equivalent of the carboxyl groups in the acrylic acid in the aqueous solution was added to prepare an aqueous solution of zinc acrylate (zinc salt of acrylic acid). A photopolymerization initiator (Chiba Specialty Chemicals, Darocure® 1173) that had been diluted to 25% by weight in isopropyl alcohol and a surfactant (Emalgen 120®, Kao) were added in the amounts of 2% and 0.4% (solids ratio) of the acrylic acid to this mixed solution to prepare unsaturated carboxylic acid compound Zn salt solution (Z-1).
(Preparation of Solution Z-2)

Acrylic acid (monomer, Kyoeisha) was diluted with water to prepare a 25% aqueous solution. Potassium hydroxide (Kanto Chemical) was added in the amount of 1 chemical equivalent of the carboxyl groups in the acrylic acid in the aqueous solution to prepare an aqueous solution of potassium acrylate (K salt of acrylic acid).

Next, a photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were added to the resulting aqueous solution of potassium acrylate in the amounts of 2% and 0.4% (solids ratio), respectively, of the acrylic acid to prepare unsaturated carboxylic acid compound K salt solution (Z-2).
(Preparation of Solution Z-3)

PEG #400 diacrylate (molecular weight 522, Kyoeisha, Light-Acrylate® 9EG-A) was diluted with water to prepare a 30% weight aqueous solution.

Next, the resulting solution, a photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were mixed in the molar proportions of 98.5%, 1.2% and 0.3%, respectively, to prepare polyvalent unsaturated acrylic acid ester solution (Z-3).
(Preparation of Solution W-1)

Polyacrylic acid (Jurimer® AC10SL, average degree of polymerization 28, 40% aqueous solution, Nihon Junyaku) was diluted with water to prepare a 10% aqueous solution. Zinc oxide (Kanto Chemical) was added to this aqueous solution in the amount of 0.35 chemical equivalents of the polyacrylic acid, and dissolved to prepare zinc-neutralized polyacrylic acid aqueous solution (W-1).
(Preparation of solution W-2)

Acrylic acid (monomer, Kyoeisha) was diluted with water to prepare a 25% aqueous solution. Lithium hydroxide (Kanto Chemical) was added in the amount of 1 chemical equivalent of the carboxyl groups in the acrylic acid in the aqueous solution to prepare an aqueous solution of lithium acrylate (Li salt of acrylic acid).

Next, a photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were added to the resulting lithium acrylate aqueous solution in the amounts of 2% and 0.4% (solids ratio) of the acrylic acid to prepare unsaturated carboxylic acid compound Li salt solution (W-2).
(Preparation of Solution W-3)

PEG #600 diacrylate (molecular weight 742, Kyoeisha, Light-Acrylate® 14EG-A) was diluted with water to prepare a 30% weight aqueous solution.

Next, the resulting solution, a photopolymerization initiator ([1-[4-(2-hydroxyethoxy)-phenyl]-2-hydroxy-2-methyl-1-propan-1-one, Chiba Specialty Chemicals, Irgacure® 2959) diluted to 25% by weight with methyl alcohol and a surfactant (Emalgen 120®, Kao) were mixed in the molar proportions of 98.5%, 1.2% and 0.3%, respectively, to prepare polyvalent unsaturated acrylic acid ester solution (W-3).
(Water-Soluble Polymer B)

(1) Polyvinyl alcohol: degree of polymerization 1700, degree of saponification 98.5% mole, Kuraray PVA117® (B-1)
(2) Polyvinyl alcohol: degree of polymerization 500, degree of saponification 98.5% mole, Kuraray PVA105® (B-2)
(3) Ethylene-vinyl alcohol copolymer: degree of polymerization 1700, degree of saponification 98.5% mole, ethylene content 4% mole (B-3)
(4) Ethylene-vinyl alcohol copolymer: degree of polymerization 1000, degree of saponification 98.5% mole, ethylene content 6% mole (B-4)
(5) Ethylene-vinyl alcohol copolymer: degree of polymerization 500, degree of saponification 98.5% mole, ethylene content 8% mole (B-5)
(6) Soluble starch: Wako Pure Chemical Industries (B-6)
(7) Polyethylene imine: Nippon Shokubai P-1000° (B-7)
(8) Polyvinylpyrrolidone: BASF Luvitec® K90 (B-8)

When preparing a coating solution using the above water-soluble polymers (B), the water-soluble polymer is first dissolved in hot water to prepare an aqueous solution with a concentration of 10% by weight.

Example 8

The aforementioned solution (X-1) was coated with a Meyer bar on the aluminum oxide-metallized surface of a film substrate consisting of a 12 µm-thick aluminum oxide-metallized biaxial oriented polyethylene terephthalate film (Toh-cello TL-PET® H#12) to 3.5 g/m$^2$, and dried at 60° C. for 12 seconds with a hot-air dryer. This was immediately fixed coated side up on a stainless steel plate, and polymerized by exposure to ultraviolet rays under conditions of UV strength 190 mW/cm$^2$, cumulative light 250 mJ/cm$^2$ using a UV irradiator (Eye Graphics EYE GRANDAGE type ECS 301G1) to obtain a gas-barrier layered film. The resulting gas-barrier layered film was evaluated by the methods described above.

The evaluation results are shown in Table 2.

The oxygen permeability and water-vapor permeability of the gas-barrier layered film were measured using a multilayer film obtained by dry-laminating it to the surface of the acrylic acid polyvalent metal salt polymer layer (unsaturated carboxylic acid compound polyvalent metal salt polymer layer) of a gas-barrier layered film obtained by coating and drying a urethane adhesive (12 parts by weight polyurethane adhesive (Mitsui Takeda Chemicals, Takelac® A310), 1 part by weight isocyanate hardening agent (Mitsui Takeda Chemicals, Takenate® A3) and 7 parts by weight ethyl acetate (Kanto Chemical)) on one side of a 50 μm-thick linear low-density polyethylene film (Tohcello T.U.X. FCS®).

Example 9

Using a mixed 1:1 (weight ratio) solution of solution (X-1) and water, a gas-barrier layered film was obtained as in Example 8 except that the solution was applied to obtain a zinc acrylate spread of 1.7 g/m$^2$.

The evaluation results for the resulting gas-barrier layered film are shown in Table 1.

Example 10

Using a mixed 1:3 (weight ratio) solution of solution (X-1) and water, a gas-barrier layered film was obtained as in Example 8 except that the solution was applied to obtain a zinc acrylate spread of 0.8 g/m$^2$.

The evaluation results for the resulting gas-barrier layered film are shown in Table 2.

Example 11

Using a mixed 1:1 (weight ratio) solution of solution (Y-1) and water, a gas-barrier layered film was obtained as in Example 8 except that the solution was applied so as to obtain a calcium acrylate spread of 1.7 g/m$^2$.

The evaluation results for the resulting gas-barrier layered film are shown in Table 2.

Example 12

Using a mixed 1:3 (weight ratio) solution of solution (Y-1) and water), a gas-barrier layered film was obtained as in Example 8 except that the solution was applied so as to obtain a calcium acrylate spread of 0.8 g/m$^2$.

The evaluation results for the resulting gas-barrier layered film are shown in Table 2.

Example 13

A gas-barrier layered film was obtained as in Example 8 except that solution (Z-1) was used in place of solution (X-1).

The evaluation results for the resulting gas-barrier layered film are shown in Table 2.

Reference Example 1

The evaluation results for the 12 μm-thick aluminum oxide-metallized biaxial oriented polyethylene terephthalate film (Tohcello TL-PET® H#12) used in Example 8 are given in Table 2.

Example 14

A gas-barrier layered film was obtained as in Example 9 except that a 12-μm thick biaxial oriented polyester film (Unitika, Emblet® PET 12) was used as the film substrate in place of the aluminum oxide-metallized biaxial oriented polyethylene terephthalate film used in Example 9. A mixed 1:1 (weight ratio) solution of solution (X-1) and water was applied to the corona treated surface of the biaxial oriented polyester film.

The evaluation results for the resulting gas-barrier layered film are shown in Table 2.

Example 15

A gas-barrier layered film was obtained as in Example 10 except that a 12 μm-thick biaxial oriented polyester film (Unitika, Emblet® PET 12) was used as the film substrate in place of the aluminum oxide-metallized biaxial oriented polyethylene terephthalate film used in Example 10. A mixed 1:3 (weight ratio) solution of solution (X-1) and water was applied to the corona treated surface of the biaxial oriented polyester film.

The evaluation results for the resulting gas-barrier layered film are shown in Table 2.

Example 16

A gas-barrier layered film was obtained as in Example 11 except that a 12 μm-thick biaxial oriented polyester film (Unitika, Emblet® PET 12) was used as the film substrate in place of the aluminum oxide-metallized biaxial oriented polyethylene terephthalate film used in Example 11. A mixed 1:1 (weight ratio) solution of solution (Y-1) and water was applied to the corona treated surface of the biaxial oriented polyester film.

The evaluation results for the resulting gas-barrier layered film are shown in Table 2.

Example 17

A gas-barrier layered film was obtained as in Example 12 except that a 12 μm-thick biaxial oriented polyester film (Unitika, Emblet® PET 12) was used as the film substrate in place of the aluminum oxide-metallized biaxial oriented polyethylene terephthalate film used in Example 12. A mixed 1:3 (weight ratio) solution of solution (Y-1) and water was applied to the corona treated surface of the biaxial oriented polyester film.

The evaluation results for the resulting gas-barrier layered film are shown in Table 2.

Example 18

A gas-barrier layered film was obtained as in Example 13 except that a 12 μm-thick biaxial oriented polyester film (Unitika, Emblet® PET 12) was used as the film substrate in place of the aluminum oxide-metallized biaxial oriented polyethylene terephthalate film used in Example 13. Solution (Z-1) was applied to the corona treated surface of the biaxial oriented polyester film.

The evaluation results for the resulting gas-barrier layered film are shown in Table 2.

Reference Example 2

The evaluation results for the biaxial oriented polyester film having a thickness of 12 μm (Unitika, Emblet® PET 12) used in Reference Example 1 and Examples 14-18 are given in Table 2.

The oxygen permeability of the gas-barrier layered films, etc. obtained in Examples 8-18 and Reference Examples 1-2 was measured using a Mocon OX-TRAN 2/20.

barrier properties under highly humid conditions, although it was resistant to water vapor permeation.

The layered films obtained by forming a polymer layer of a polyvalent metal salt of an unsaturated carboxylic acid compound on a film substrate without a vapor-deposited inorganic compound had much better oxygen barrier properties than the film (Reference Example 2) without a polymer layer of a polyvalent metal salt of an unsaturated carboxylic acid compound, but in comparison with the gas-barrier layered films (Examples 8-13) obtained by forming a polymer layer of a polyvalent metal salt of an unsaturated carboxylic acid compound on an inorganic compound deposition layer, they tended to have poorer oxygen barrier and water vapor barrier properties when the polymer layer of the polyvalent metal salt of an unsaturated carboxylic acid compound was thin (when

TABLE 2

| | Composition | Gas-barrier layer spread g/m² | $A_0/A$ | Pre hot-water treatment | | Post hot-water treatment | |
|---|---|---|---|---|---|---|---|
| | | | | Oxygen permeability ml/(m²/day/MPa) | Water vapor permeability g/(m²/day) | Oxygen permeability ml/(m²/day/MPa) | Water vapor permeability g/(m²/day) |
| Ex 8 | PET/AlO$_x$/zinc acrylate polymer | 3.5 | 0.04 | 2 | 0.6 | 3 | 0.6 |
| Ex 9 | PET/AlO$_x$/zinc acrylate polymer | 1.7 | 0.06 | 2 | 0.6 | 3 | 0.6 |
| Ex 10 | PET/AlO$_x$/zinc acrylate polymer | 0.8 | 0.04 | 7 | 0.7 | 7 | 0.7 |
| Ex 11 | PET/AlO$_x$/calcium acrylate polymer | 1.7 | 0.07 | 3 | 0.7 | Delamination | Delamination |
| Ex 12 | PET/AlO$_x$/calcium acrylate polymer | 0.8 | 0.06 | 6 | 1.0 | Delamination | Delamination |
| Ex 13 | PET/AlO$_x$/zinc acrylate polymer | 3.5 | 0.14 | 3 | 0.6 | 4 | 0.7 |
| RE 1 | PET/AlO$_x$ | — | — | 14 | 1.0 | 21 | 2.2 |
| Ex 14 | PET/zinc acrylate polymer | 1.7 | 0.04 | 5 | 8.0 | 5 | 8.0 |
| Ex 15 | PET/zinc acrylate polymer | 0.8 | 0.06 | 40 | 8.0 | 42 | 8.0 |
| Ex 16 | PET/calcium acrylate polymer | 1.7 | 0.06 | 76 | 8.0 | Delamination | Delamination |
| Ex 17 | PET/calcium acrylate polymer | 0.8 | 0.05 | 100 | 8.0 | Delamination | Delamination |
| Ex 18 | PET/zinc acrylate polymer | 3.5 | 0.14 | 5 | 8.0 | 5 | 8.0 |
| RE 2 | PET | — | — | 900 | 8.0 | 900 | 8.0 |

As shown in Table 2, when a substrate layer having an inorganic compound deposition layer was used as the film substrate, the gas-barrier layered films (Examples 8-13) obtained by forming a polymer layer of an unsaturated carboxylic acid compound polyvalent metal salt on the inorganic compound deposition layer all had extremely good oxygen barrier properties and resistance to permeation by water vapor under conditions of high humidity. Of these, the gas-barrier films obtained by forming a zinc acrylate polymer layer on an inorganic compound deposition layer maintained excellent oxygen barrier properties and resistance to water vapor permeation under highly humid conditions even after hot water treatment. By contrast, the film having a film of vapor-deposited aluminum oxide (Reference Example 1) had poor oxygen the spread of the polyvalent metal salt of an unsaturated carboxylic acid compound was smaller) (Examples 14-18).

Example 19

A 1:1 mixture of solution (X-1) and water was coated to 1.7 g/m² with a Meyer bar on the corona treated surface of a film substrate consisting of a 12 μm-thick biaxial oriented polyester film (Emblet® PET 12, Unitika), and dried at 60° C. for 12 seconds using a hot-air dryer. The coated film was immediately fixed coated side up on a stainless steel plate, and polymerized by exposure to ultraviolet rays under conditions of UV strength 190 mW/cm², cumulative exposure 250 mJ/cm² using a UV irradiator (Eye Graphics EYE GRANDAGE type ECS 301G1) to obtain a layered film. The absorbance ratio ($A_0/A$) of the polymer layer of the resulting layered film was measured, and aluminum oxide was deposited thereon with an EB heated vacuum deposition unit (Ulvac EBH-6) to obtain a gas-barrier layered film.

The resulting gas-barrier layered film was evaluated by the methods described above. The evaluation results are shown in Table 3.

The oxygen permeability and water vapor permeability of the gas-barrier layered film were measured using a multilayer film obtained by dry-laminating it to the surface of the acrylic acid polyvalent metal salt polymer layer (unsaturated carboxylic acid compound polyvalent metal salt polymer layer) of a gas-barrier layered film obtained by coating and drying a urethane adhesive (12 parts by weight polyurethane adhesive (Mitsui Takeda Chemicals, Takelac® A310), 1 part by weight isocyanate hardening agent (Mitsui Takeda Chemicals, Takenate® A3) and 7 parts by weight ethyl acetate (Kanto Chemical)) on one side of a 50 μm-thick linear low-density polyethylene film (Tohcello T.U.X. FCS®).

Example 20

A gas-barrier layered film was obtained as in Example 19 except that a 1:3 (weight ratio) mixed solution of solution (X-1) and water was used in place of the solution (X-1) used in Example 19, and applied so as to achieve a zinc acrylate spread of 0.8 g/m$^2$.

The evaluation results for the resulting gas-barrier layered film are given in Table 3.

Example 21

A gas-barrier layered film was obtained as in Example 19 except that a 1:1 (weight ratio) mixed solution of solution (Y-1) and water was used in place of the solution (X-1) used in Example 19, and coated so as to achieve a calcium acrylate spread of 1.7 g/m$^2$.

The evaluation results for the resulting gas-barrier layered film are given in Table 3.

Example 22

A gas-barrier layered film was obtained as in Example 19 except that a 1:3 (weight ratio) mixed solution of solution (Y-1) and water was used in place of the solution (X-1) used in Example 19, and coated so as to achieve a calcium acrylate spread of 0.8 g/m$^2$.

The evaluation results for the resulting gas-barrier layered film are given in Table 3.

Example 23

A gas-barrier layered film was obtained as in Example 19 except that solution (Z-1) was used in place of the solution (X-1) used in Example 19.

The evaluation results for the resulting gas-barrier layered film are given in Table 3.

Reference Example 3

The evaluation results for a 12 μm-thick aluminum oxide-metallized biaxial oriented polyethylene terephthalate film (TL-PET H#12®, Tohcello) are given in Table 3.

Comparative Example 7

A gas-barrier layered film was obtained as in Example 19 except that in place of the solution (X-1) used in Example 19, solution (W-1) was coated with a Meyer bar on the corona treated surface of a 12 μm-thick biaxial oriented polyester film (Emblet® PET 12, Unitika) to 1.7 g/m$^2$ and dried at 60° C. for 30 seconds with a hot-air dryer.

The evaluation results for the resulting gas-barrier layered film are given in Table 3.

The oxygen permeability of the gas-barrier layered films, etc. obtained in Examples 19-23, Reference Example 3 and Comparative Example 7 was measured using a Mocon. OX-TRAN 2/21.

TABLE 3

| | Composition | Gas-barrier layer spread g/m$^2$ | Absorbance ratio $A_0/A$ | Oxygen permeability (before hot water treatment) ml/(m$^2$/day/MPa) | Oxygen permeability (after hot water treatment) ml/(m$^2$/day/MPa) |
|---|---|---|---|---|---|
| Ex 19 | PET/zinc acrylate polymer/AlO$_x$ | 1.7 | 0.05 | 1 or less | 1 |
| Ex 20 | PET/zinc acrylate polymer/AlO$_x$ | 0.8 | 0.05 | 1 or less | 1 |
| Ex 21 | PET/calcium acrylate polymer/AlO$_x$ | 1.7 | 0.06 | 1 or less | Delamination |
| Ex 22 | PET/calcium acrylate polymer/AlO$_x$ | 0.8 | 0.05 | 1 or less | Delamination |
| Ex 23 | PET/zinc acrylate polymer/AlO$_x$ | 1.7 | 0.14 | 1 or less | 1 |
| RE 3 | PET/AlO$_x$ | — | — | 14 | 21 |
| CE 7 | PET/zinc neutralized polyacrylic acid/AlO$_x$ | 1.7 | 1.39 | 25 | 220 |

As shown in Table 3, the gas-barrier layered films (Examples 19-23) obtained by forming an inorganic compound deposition layer on a polymer layer of a polyvalent metal salt of an unsaturated carboxylic acid compound had extremely good oxygen barrier properties under highly humid conditions. Of these, the gas-barrier layered films obtained by forming an inorganic compound deposition layer on a zinc acrylate polymer layer maintained excellent oxygen barrier properties under highly humid conditions even after hot water treatment. By contrast, the oxygen barrier properties of the film (Reference Example 3) having a vapor-deposited inorganic compound (aluminum oxide) were unsatisfactory after hot water treatment.

In the case of the laminated film (Comparative Example 7) using polyacrylic acid with a degree of polymerization over 20, only a partially-neutralized polycarbonate with a high absorbance ratio ($A_0/A=0.79$, abundant free carboxylic acid) was obtained, and the oxygen barrier properties were adversely affected by free carboxylic acid groups infiltrating the aluminum oxide layer.

Example 24

The aforementioned unsaturated carboxylic acid compound Zn salt solution (X-2) and unsaturated carboxylic acid compound Na salt solution (Y-2) were mixed so as to achieve a Zn acrylate content of 96% mole and an Na acrylate content of 4% mole, and this mixed solution was coated with a Meyer bar and applied to 3.5 g/m$^2$ to the corona treated surface of a film substrate consisting of a 12 μm-thick biaxial oriented polyester film (Emblet® PET 12, Unitika) and dried at 60° C. for 30 seconds with a hot-air dryer. This was then immediately fixed coated side up on a stainless steel plate, and polymerized by exposure to ultraviolet rays under conditions of UV strength 190 mW/cm$^2$, cumulative light 250 mJ/cm$^2$ using a UV irradiator (Eye Graphics EYE GRANDAGE type ECS 301G1) to obtain a gas-barrier layered film. The resulting gas-barrier layered film was evaluated by the methods described above.

The evaluation results are shown in Table 4.

Example 25

A gas-barrier layered film was obtained as in Example 24 except that a mixed solution of the aforementioned unsaturated carboxylic acid compound Zn salt solution (X-2) and unsaturated carboxylic acid compound Na solution (Y-2) mixed to achieve a Zn acrylate content of 90% mole and an Na acrylate content of 10% mole was used in place of the mixed solution used in Example 24. The resulting gas-barrier layered film was evaluated by the methods described above.

The evaluation results are given in Table 4.

Example 26

A gas-barrier layered film was obtained as in Example 24 except that a mixed solution of the aforementioned unsaturated carboxylic acid compound Zn salt solution (X-2) and unsaturated carboxylic acid compound Na solution (Y-2) mixed to achieve a Zn acrylate content of 80% mole and an Na acrylate content of 20% mole was used in place of the mixed solution used in Example 24. The resulting gas-barrier layered film was evaluated by the methods described above.

The evaluation results are given in Table 4.

Example 27

A gas-barrier layered film was obtained as in Example 24 except that a mixed solution of the aforementioned unsaturated carboxylic acid compound Zn salt solution (X-2) and unsaturated carboxylic acid compound Na solution (Y-2) mixed to achieve a Zn acrylate content of 60% mole and an Na acrylate content of 40% mole was used in place of the mixed solution used in Example 24. The resulting gas-barrier layered film was evaluated by the methods described above.

The evaluation results are given in Table 4.

Example 28

A gas-barrier layered film was obtained as in Example 24 except that a mixed solution of the aforementioned unsaturated carboxylic acid compound Zn salt solution (X-2) and unsaturated carboxylic acid compound K salt solution (Z-2) mixed to achieve a Zn acrylate content of 80% mole and a K acrylate content of 20% mole was used in place of the mixed solution used in Example 24. The resulting gas-barrier layered film was evaluated by the methods described above.

The evaluation results are given in Table 4.

Example 29

A gas-barrier layered film was obtained as in Example 24 except that a mixed solution of the aforementioned unsaturated carboxylic acid compound Zn salt solution (X-2) and unsaturated carboxylic acid compound K salt solution (Z-2) mixed to achieve a Zn acrylate content of 60% mole and a K acrylate content of 40% mole was used in place of the mixed solution used in Example 24. The resulting gas-barrier layered film was evaluated by the methods described above.

The evaluation results are given in Table 4.

Example 30

A gas-barrier layered film was obtained as in Example 24 except that a mixed solution of the aforementioned unsaturated carboxylic acid compound Zn salt solution (X-2) and unsaturated carboxylic acid compound Li salt solution (W-2) mixed to achieve a Zn acrylate content of 60% mole and a Li acrylate content of 40% mole was used in place of the mixed solution used in Example 24. The resulting gas-barrier layered film was evaluated by the methods described above.

The evaluation results are given in Table 4.

Example 31

The aforementioned unsaturated carboxylic compound Zn salt solution (X-2) was coated with a Meyer bar and applied to 3.5 g/m$^2$ to the corona treated surface of a film substrate consisting of a 12 μm-thick biaxial oriented polyester film (Emblet® PET 12, Unitika), and dried at 60° C. for 15 seconds with a hot-air dryer. This was immediately fixed coated side up on a stainless steel plate, and polymerized by exposure to ultraviolet rays under conditions of UV strength 190 mW/cm$^2$, cumulative light 250 mJ/cm$^2$ using a UV irradiator (Eye Graphics EYE GRANDAGE type ECS 301G1) to obtain a gas-barrier layered film. The resulting gas-barrier layered film was evaluated by the methods described above.

The results are given in Table 4.

Reference Example 4

A gas-barrier layered film was obtained as in Example 31 except that the drying time was changed to 30 seconds. The resulting gas-barrier layered film was evaluated by the methods described above.

The results are given in Table 4.

The oxygen permeability of the gas-barrier layered films, etc. obtained in Examples 24-31 and Reference Example 4 was measured using a Mocon OX-TRAN 2/21 ML.

TABLE 4

| | Unsaturated carboxylic acid polyvalent metal salt | Unsaturated carboxylic acid univalent metal salt | % mole Poly | % mole Uni | Drying time secs | Spread g/m² | absorbance ratio A₀/A | Oxygen permeability (20° C., 90% RH) ml/(m²/day/MPa) | Surface resistivity Ω |
|---|---|---|---|---|---|---|---|---|---|
| Ex 24 | Zinc acrylate | Sodium acrylate | 96 | 4 | 30 | 3.5 | 0.05 | 1 or less | — |
| Ex 25 | Zinc acrylate | Sodium acrylate | 90 | 10 | 30 | 3.5 | 0.05 | 1 or less | — |
| Ex 26 | Zinc acrylate | Sodium acrylate | 80 | 20 | 30 | 3.5 | 0.08 | 6 | $1 \times 10^{14}$ |
| Ex 27 | Zinc acrylate | Sodium acrylate | 60 | 40 | 30 | 3.5 | 0.06 | 13 | $2 \times 10^{12}$ |
| Ex 28 | Zinc acrylate | Potassium acrylate | 80 | 20 | 30 | 3.5 | 0.03 | 1 or less | $1 \times 10^{15}$ |
| Ex 29 | Zinc acrylate | Potassium acrylate | 60 | 40 | 30 | 3.5 | 0.04 | 7 | $2 \times 10^{12}$ |
| Ex 30 | Zinc acrylate | Lithium acrylate | 60 | 40 | 30 | 3.5 | 0.06 | 10 | $5 \times 10^{12}$ |
| Ex 31 | Zinc acrylate | — | 100 | 0 | 15 | 3.5 | 0.07 | 1 or less | $8 \times 10^{15}$ |
| RE 2 | Zinc acrylate | — | 100 | 0 | 30 | 3.5 | 0.06 | 243 | — |

As shown in Table 4, when a univalent metal salt of an unsaturated carboxylic acid compound was added (Examples 24-30) good gas barrier properties (low oxygen permeability) under high humidity were achieved even with long drying times because the metal salt was less likely to crystallize. The surface resistivity also tended to be lower (indicated greater static resistance) the greater the added amount of the univalent metal.

When no univalent metal salt was added (Example 31 and Reference Example 4), on the other hand, strong barrier properties were achieved with a short drying time (when polymerization was performed with a suitable moisture content) (Example 31), but when the drying time was extended crystals of the metal salt occurred due to the reduced moisture content of the film during polymerization, detracting from the gas barrier properties.

Example 32

The aforementioned unsaturated carboxylic acid compound Zn salt solution (X-2) and polyvalent unsaturated acrylic acid ester solution (Y-3) were mixed to obtain a Zn acrylate content of 93% by weight and a PEG #200 diacrylate content of 7% by weight, and this mixed solution was applied with a Meyer bar to 3.5 g/m² (solids) on the corona treated surface of a film substrate consisting of a 12 μm-thick biaxial oriented polyester film (Unitika, Emblet® PET 12), and dried with a hot-air dryer. This was immediately fixed coated side up on a stainless steel plate, and polymerized by exposure to ultraviolet rays under conditions of UV strength 190 mW/cm², cumulative light 250 mJ/cm² using a UV irradiator (Eye Graphics EYE GRANDAGE type ECS 301G1) to obtain a gas-barrier layered film. The resulting gas-barrier layered film was evaluated by the methods described above.

The evaluation results are given in Table 5.

Example 33

A gas-barrier layered film was obtained as in Example 32 except that a mixed solution of the aforementioned unsaturated carboxylic acid compound Zn salt solution (X-2) and polyvalent unsaturated acrylic acid ester solution (Y-3) mixed so as to achieve a Zn acrylate content of 86% by weight and a PEG #200 diacrylate content of 14% by weight was used. The resulting gas-barrier layered film was evaluated by the methods described above.

The evaluation results are given in Table 5.

Example 34

A gas-barrier layered film was obtained as in Example 32 except that a mixed solution of the aforementioned unsaturated carboxylic acid compound Zn salt solution (X-2) and polyvalent unsaturated acrylic acid ester solution (Z-3) mixed so as to achieve a Zn acrylate content of 88% by weight and a PEG #400 diacrylate content of 12% by weight was used in place of the mixed solution used in Example 32. The resulting gas-barrier layered film was evaluated by the methods described above.

The evaluation results are given in Table 5.

Example 35

A gas-barrier layered film was obtained as in Example 32 except that a mixed solution of the aforementioned unsaturated carboxylic acid compound Zn salt solution (X-2) and polyvalent unsaturated acrylic acid ester solution (Z-3) mixed so as to achieve a Zn acrylate content of 78% by weight and a PEG #400 diacrylate content of 22% by weight was used in place of the mixed solution used in Example 32. The resulting gas-barrier layered film was evaluated by the methods described above.

The evaluation results are given in Table 5.

Example 36

A gas-barrier layered film was obtained as in Example 32 except that a mixed solution of the aforementioned unsaturated carboxylic acid compound Zn salt solution (X-2) and polyvalent unsaturated acrylic acid ester solution (W-3) mixed so as to achieve a Zn acrylate content of 84% by weight and a PEG #600 diacrylate content of 16% by weight was used in place of the mixed solution used in Example 32. The resulting gas-barrier layered film was evaluated by the methods described above.

The evaluation results are given in Table 5.

Example 37

A gas-barrier layered film was obtained as in Example 32 except that a mixed solution of the aforementioned unsaturated carboxylic acid compound Zn salt solution (X-2) and polyvalent unsaturated acrylic acid ester solution (W-3) mixed so as to achieve a Zn acrylate content of 71% by weight and a PEG #600 diacrylate content of 29% by weight was used in place of the mixed solution used in Example 32. The resulting gas-barrier layered film was evaluated by the methods described above.

The evaluation results are given in Table 5.

Example 38

A gas-barrier layered film was obtained as in Example 35 except that the film substrate was an aluminum oxide-metallized film (Tohcello TL PET H®). The resulting gas-barrier layered film was evaluated by the methods described above.

The evaluation results are given in Table 5.

Example 39

A gas-barrier layered film was obtained as in Example 37 except that the film substrate was an aluminum oxide-metallized film (Tohcello TL PET H®). The resulting gas-barrier layered film was evaluated by the methods described above.

The evaluation results are given in Table 5.

Example 40

The aforementioned unsaturated carboxylic acid compound Zn salt solution (X-2) was applied with a Meyer bar to 3.5 g/m² on the corona treated surface of a substrate film consisting of a 12 μm-thick biaxial oriented polyester film (Emblet® PET 12, Unitika) and dried at 60° C. for 15 seconds in a hot-air dryer. This was immediately fixed coated side up on a stainless steel plate, and polymerized by exposure to ultraviolet rays under conditions of UV strength 190 mW/cm², cumulative light 250 mJ/cm² using a UV irradiator (Eye Graphics EYE GRANDAGE type ECS 301G1) to obtain a gas-barrier layered film. The resulting gas-barrier layered film was evaluated by the methods described above.

The evaluation results are given in Table 5.

The oxygen permeability of the gas-barrier layered films, etc. obtained in Examples 32-40 was measured using a Mocon OX-TRAN 2/21 ML.

TABLE 5

| | Substrate | Unsat. carboxylic acid polyvalent metal salt (a1) | Polyvalent unsat. carboxylic acid ester (a2) | Weight % a1 | Weight % a2 | Spread g/m² | $A_0/A$ | Oxygen permeability (20° C., 50% RH) ml/(m²/day/MPa) | Oxygen permeability (20° C., 90% RH) ml/(m²/day/MPa) | Surface state after 2% drawing | Surface state after 3% drawing |
|---|---|---|---|---|---|---|---|---|---|---|---|
| Ex 32 | PET | Zinc acrylate | PEG #200 diacrylate | 93 | 7 | 3.5 | 0.05 | 1 | 1 | ○ | X |
| Ex 33 | PET | Zinc acrylate | PEG #200 diacrylate | 86 | 14 | 3.5 | 0.05 | 4 | 4 | ○ | Δ |
| Ex 34 | PET | Zinc acrylate | PEG #400 diacrylate | 88 | 12 | 3.5 | 0.05 | 4 | 2 | Δ | X |
| Ex 35 | PET | Zinc acrylate | PEG #400 diacrylate | 78 | 22 | 3.5 | 0.05 | 12 | 25 | ○ | ○ |
| Ex 36 | PET | Zinc acrylate | PEG #600 diacrylate | 84 | 16 | 3.5 | 0.08 | 11 | 11 | ○ | X |
| Ex 37 | PET | Zinc acrylate | PEG #600 diacrylate | 71 | 29 | 3.5 | 0.05 | 57 | 470 | ○ | ○ |
| Ex 38 | PET/AlO$_x$ | Zinc acrylate | PEG #400 diacrylate | 78 | 22 | 3.5 | 0.03 | 1 | 1 | ○ | ○ |
| Ex 39 | PET/ALO$_x$ | Zinc acrylate | PEG #600 diacrylate | 71 | 29 | 3.5 | 0.04 | 2 | 2 | ○ | ○ |
| Ex 40 | PET | Zinc acrylate | — | 100 | 0 | 3.5 | 0.07 | 1 or less | 1 or less | X | X |

As shown in Table 5, when a polyvalent unsaturated carboxylic acid ester was added (Examples 32-39) the gas-barrier properties were less dependent on humidity, and the films were less liable to cracking when drawn.

However, when no polyvalent unsaturated carboxylic acid ester was added (Example 40), although resistance to oxygen permeation (oxygen barrier properties) was good under conditions of high humidity, cracking occurred after 2% drawing.

Examples 41-44

Aqueous solutions of acrylic acid Zn salt solution (X-2) and water-soluble polymer (B-1) were mixed with zinc acrylate and the water-soluble polymer (B-1) in the weight ratios (solids) shown in Table 6, and these solutions were adjusted to a solids concentration of 20% by weight to prepare coating solutions. These coating solutions were then applied with a Meyer bar to 2.3 g/m² (solids) on the corona treated surface of a film substrate consisting of a 12 μm-thick biaxial oriented polyester film (Unitika, Emblet® PET 12), and dried at 40° C. for 30 seconds with a hot-air dryer. These were immediately fixed coated side up on stainless steel plates, and polymerized by exposure to ultraviolet rays under conditions of UV strength 180 mW/cm², cumulative light 180 mJ/cm² using a UV irradiator (Eye Graphics EYE GRANDAGE type ECS 301G1) to obtain gas-barrier layered films. The resulting gas-barrier layered films were evaluated by the methods described above.

The evaluation results are shown in Table 6. In the case of Example 41, the water content of the coated film as measured by the methods described above was 36.2%.

Examples 45-48

Gas-barrier layered films were obtained as in Examples 41-44 except that water-soluble polymer (B-2) was used in place of the water-soluble polymer (B-1) used in Examples 41-44. The resulting gas-barrier layered films were evaluated by the methods described above.

The evaluation results are shown in Table 6.

Examples 49 and 50

Gas-barrier layered films were obtained as in Examples 42 and 44 except that water-soluble polymer (B-3) was used in place of the water-soluble polymer (B-1) used in Examples 42 and 44. The resulting gas-barrier layered films were evaluated by the methods described above.

The evaluation results are shown in Table 6.

Examples 51 and 52

Gas-barrier layered films were obtained as in Examples 42 and 44 except that water-soluble polymer (B-4) was used in place of the water-soluble polymer (B-1) used in Examples 42 and 44. The resulting gas-barrier layered films were evaluated by the methods described above.

The evaluation results are shown in Table 6.

Examples 53 and 54

Gas-barrier layered films were obtained as in Examples 42 and 44 except that water-soluble polymer (B-5) was used in place of the water-soluble polymer (B-1) used in Examples 42 and 44. The resulting gas-barrier layered films were evaluated by the methods described above.

The evaluation results are shown in Table 6.

Examples 55 and 56

Gas-barrier layered films were obtained as in Examples 42 and 44 except that water-soluble polymer (B-6) was used in place of the water-soluble polymer (B-1) used in Examples 42 and 44. The resulting gas-barrier layered films were evaluated by the methods described above.

The evaluation results are shown in Table 6.

Example 57

A gas-barrier layered film was obtained as in Example 41 except that water-soluble polymer (B-7) was used in place of the water-soluble polymer (B-1) used in Example 41. The resulting gas-barrier layered films were evaluated by the methods described above.

The evaluation results are shown in Table 6.

Example 58

A gas-barrier layered film was obtained as in Example 41 except that water-soluble polymer (B-8) was used in place of the water-soluble polymer (B-1) used in Example 41. The resulting gas-barrier layered films were evaluated by the methods described above.

The evaluation results are shown in Table 6.

Example 59

A gas-barrier layered film was obtained as in Example 43 except that the film substrate was an aluminum oxide-metallized film (Tohcello, TL-PET H®). The resulting gas-barrier layered films were evaluated by the methods described above.

The evaluation results are shown in Table 6.

Example 60

A gas-barrier layered film was obtained as in Example 59 except that water-soluble polymer (B-3) was used in place of the water-soluble polymer (B-1) used in Example 59. The resulting gas-barrier layered films were evaluated by the methods described above.

The evaluation results are shown in Table 6.

Example 61

Aluminum oxide ($AlO_x$) was deposited with an EB heated vacuum deposition unit (Ulvac EBH-6) on the gas-barrier film of the gas-barrier layered film obtained in Example 43 to obtain a gas-barrier layered film. Next, a urethane adhesive (12 parts by weight polyurethane adhesive (Mitsui Takeda Chemicals, Takelac® A310), 1 part by weight isocyanate hardening agent (Mitsui Takeda Chemicals, Takenate® A3) and 7 parts by weight ethyl acetate (Kanto Chemical)) was coated and dried on the corona treated surface of a 50 µm-thick linear low-density polyethylene film (LL film: Tohcello T.U.X. FCS®), and dry-laminated to the aluminum oxide-metallized surface of the gas-barrier layered film to obtain a multilayer film. The oxygen permeability of the resulting multilayer film (gas-barrier layered film) was evaluated by the methods described above.

The evaluation results are given in Table 6.

Example 62

A gas-barrier layered film was obtained as in Example 41 except that a coating solution comprising Zn acrylate salt solution (X-2) with the solids adjusted to 20% by weight with water was used in place of the coating solution used in Example 41. The resulting gas-barrier layered film was evaluated by the methods described above.

The evaluation results are given in Table 6.

Reference Example 5

Polyacrylic acid (Nihon Junyaku, Jurimer® AC10SL, average degree of polymerization 28, 40% aqueous solution) was diluted with water to prepare a 10% aqueous solution. Zinc oxide (Kanto Chemical) was added and dissolved in the amount of 0.35 chemical equivalents of the carboxyl groups in the polyacrylic acid to obtain an aqueous zinc polyacrylate salt solution as a coating solution.

This coating solution was applied to 2.3 g/m² (solids) with a Meyer bar to the corona treated surface of a film substrate consisting of a 12 µm-thick biaxial oriented polyester film (Emblet® PET 12, Unitika), and dried at 90° C. for 60 seconds with a hot-air dryer to obtain a gas-barrier layered film. The resulting gas-barrier layered film was evaluated by the methods described above.

The evaluation results are given in Table 6.

When zinc oxide was added in the amount of 0.5 chemical equivalents of the carboxyl groups in the polyacrylic acid in an effort to further neutralize the solution, the zinc salt of polyacrylic acid precipitated in the aqueous solution, making it difficult to coat the substrate.

Comparative Example 8

An aqueous solution of water-soluble polymer (B-1) was applied with a Meyer bar to 2.3 g/m² (solids) to the corona treated surface of a film substrate consisting of a 12 µm-thick biaxial oriented polyester film (Unitika, Emblet® PET 12), and dried with a hot-air dryer. The resulting layered film was evaluated by the methods described above.

The evaluation results are given in Table 6.

Comparative Example 9

A layered film was obtained as in Comparative Example 8 except that water-soluble polymer (B-2) was used in place of the water-soluble polymer (B-1) used in Comparative Example 8). The resulting layered film was evaluated by the methods described above.

The evaluation results are given in Table 6.

Comparative Example 10

A layered film was obtained as in Comparative Example 8 except that water-soluble polymer (B-3) was used in place of the water-soluble polymer (B-1) used in Comparative Example 8). The resulting layered film was evaluated by the methods described above.

The evaluation results are given in Table 6.

Comparative Example 11

A layered film was obtained as in Comparative Example 8 except that water-soluble polymer (B-4) was used in place of the water-soluble polymer (B-1) used in Comparative Example 8). The resulting layered film was evaluated by the methods described above.

The evaluation results are given in Table 6.

Comparative Example 12

A layered film was obtained as in Comparative Example 8 except that water-soluble polymer (B-5) was used in place of the water-soluble polymer (B-1) used in Comparative Example 8). The resulting layered film was evaluated by the methods described above.

The evaluation results are given in Table 6.

Comparative Example 13

A layered film was obtained as in Comparative Example 8 except that water-soluble polymer (B-6) was used in place of the water-soluble polymer (B-1) used in Comparative Example 8. The resulting layered film was evaluated by the methods described above.

The evaluation results are given in Table 6.

Comparative Example 14

A layered film was obtained as in Comparative Example 8 except that water-soluble polymer (B-7) was used in place of the water-soluble polymer (B-1) used in Comparative Example 8. The resulting layered film was evaluated by the methods described above.

The evaluation results are given in Table 6.

Comparative Example 15

A layered film was obtained as in Comparative Example 8 except that water-soluble polymer (B-8) was used in place of the water-soluble polymer (B-1) used in Comparative Example 8. The resulting layered film was evaluated by the methods described above.

The evaluation results are given in Table 6.

Comparative Example 16

A 12 μm-thick biaxial oriented polyester film (Unitika, Emblet® PET 12) was evaluated by the methods described above.

The evaluation results are given in Table 6.

The oxygen permeability values of the gas-barrier layered films, etc. obtained in Examples 41-62, Reference Example 5 and Comparative Examples 8-16 at 20° C., 90% RH were measured with a Mocon OX-TRAN 2/21 ML, while the oxygen permeability values at 20° C., 0% RH were measured with a Mocon OX-TRAN 2/20.

TABLE 6

| | | Solids weight % | | Oxygen permeability ml/(m²/day/MPa) | | | Surface state | |
|---|---|---|---|---|---|---|---|---|
| | Water-soluble polymer | Zinc acrylate | Water-soluble polymer | 20° C., 90% RH | 20° C., 0% RH | $A_0/A$ | after 2% drawing | Surface state after 3% drawing |
| Ex 41 | B-1 | 93.8 | 6.2 | 1 or less | 33 | 0.12 | Δ | X |
| Ex 42 | B-1 | 87.5 | 12.5 | 1 or less | 5 | 0.11 | ○ | X |
| Ex 43 | B-1 | 81.3 | 18.7 | 1 | 1 | 0.09 | ○ | Δ |
| Ex 44 | B-1 | 75.0 | 25.0 | 10 | 1 | 0.10 | ○ | ○ |
| Ex 45 | B-2 | 93.8 | 6.2 | 1 or less | 42 | 0.14 | Δ | X |
| Ex 46 | B-2 | 87.5 | 12.5 | 1 | 11 | 0.11 | ○ | X |
| Ex 47 | B-2 | 81.3 | 18.7 | 3 | 1 | 0.10 | ○ | Δ |
| Ex 48 | B-2 | 75.0 | 25.0 | 33 | 1 | 0.11 | ○ | ○ |
| Ex 49 | B-3 | 87.5 | 12.5 | 1 | 14 | 0.10 | — | — |
| Ex 50 | B-3 | 75.0 | 25.0 | 25 | 4 | 0.16 | — | — |
| Ex 51 | B-4 | 87.5 | 12.5 | 1 | 9 | 0.13 | — | — |

TABLE 6-continued

| | Water-soluble polymer | Solids weight % Zinc acrylate | Water-soluble polymer | Oxygen permeability ml/(m²/day/MPa) 20° C., 90% RH | 20° C., 0% RH | $A_0/A$ | Surface state after 2% drawing | Surface state after 3% drawing |
|---|---|---|---|---|---|---|---|---|
| Ex 52 | B-4 | 75.0 | 25.0 | 3 | 26 | 0.11 | — | — |
| Ex 53 | B-5 | 87.5 | 12.5 | 3 | 81 | 0.10 | — | — |
| Ex 54 | B-5 | 75.0 | 25.0 | 18 | 5 | 0.15 | — | — |
| Ex 55 | B-6 | 87.5 | 12.5 | 3 | 53 | 0.12 | — | — |
| Ex 56 | B-6 | 75.0 | 25.0 | 10 | 63 | 0.11 | — | — |
| Ex 57 | B-7 | 93.8 | 6.2 | 1 or less | 71 | 0.12 | — | — |
| Ex 58 | B-8 | 93.8 | 6.2 | 1 or less | 40 | 0.05 | — | — |
| Ex 59 | B-1 | 81.3 | 18.7 | 1 or less | 1 | 0.09 | — | — |
| Ex 60 | B-3 | 81.3 | 18.7 | 1 or less | 1 | 0.11 | — | — |
| Ex 61 | B-1 | 81.3 | 18.7 | 1 or less | 1 | 0.10 | — | — |
| Ex 62 | — | 100 | 0 | 1 or less | 100 | 0.12 | X | X |
| RE 5 | — | — | — | 627 | — | 1.39 | — | — |
| CE 8 | B-1 | 0 | 100 | 575 | 1 | — | — | — |
| CE 9 | B-2 | 0 | 100 | 579 | 1 | — | — | — |
| CE 10 | B-3 | 0 | 100 | 575 | 1 | — | — | — |
| CE 11 | B-4 | 0 | 100 | 551 | 1 | — | — | — |
| CE 12 | B-5 | 0 | 100 | 533 | 2 | — | — | — |
| CE 13 | B-6 | 0 | 100 | 560 | 13 | — | — | — |
| CE 14 | B-7 | 0 | 100 | 582 | 26 | — | — | — |
| CE 15 | B-8 | 0 | 100 | 589 | 1060 | — | — | — |
| CE 16 | — | — | — | 779 | 1200 | — | — | — |

Table 6 shows that in a system including a water-soluble polymer (Examples 41-61), a decrease in oxygen barrier properties under dry conditions (20° C., 0% RH) is prevented.

In a system without a water-soluble polymer (Example 62), on the other hand, the oxygen barrier properties are good in under humid conditions (20° C., 90% RH) but poorer under dry conditions (20° C., 0% RH).

When the polyacrylic acid is neutralized with zinc oxide (Reference Example 5), the oxygen barrier properties under humid conditions are not obtained.

Using only the water-soluble polymer (Comparative Examples 8-16), moreover, the oxygen barrier properties are much poorer under humid conditions (20° C., 90% RH).

Example 63

A commercial polyethylene terephthalate container (PET bottle, hollow (C2), 500 ml pressure-resistant type) was coated by immersing it in an unsaturated carboxylic acid compound Zn salt solution obtained by mixing a zinc acrylate (Zn salt of acrylic acid) aqueous solution (Asada Chemical, concentration 15% by weight (acrylic acid 10% by weight, Zn 5% by weight)), a photopolymerization initiator (1-[4-(2-hydroxyethoxy)-phenyl]-2-hydroxy-2-methyl-1-propan-1-one (Chiba Specialty Chemicals, Irgacure® 2959) dissolved to 25% by weight in methyl alcohol, and a surfactant (Emalgen 120®, Kao) in molar proportions of 98.5%, 1.2% and 0.3%. This was then dried at 60° C. for 1 minute in a hot-air dryer, and the entire container was exposed with an ultraviolet irradiator to 200 mJ/cm² to obtain a container with a polymer layer of an unsaturated carboxylic acid compound Zn salt formed on the surface thereof. The polymer layer was 3 μm thick, with an absorbance ratio ($A_0/A$) of 0.1. When a 90 mm×90 mm sample was cut out from the container, its oxygen permeability (20° C., 90% RH) was 0.1 ml/(m²/day/MPa) as measured with a Mocon OX-TRAN 2/21 ML.

EFFECTS OF THE INVENTION

The gas barrier film of the present invention, which comprises an unsaturated carboxylic acid compound crosslinked with a polyvalent metal, and a gas-barrier layered body obtained by layering this gas-barrier film on a substrate layer, have excellent gas barrier properties under humid conditions because they contain little free carboxylic acid.

Moreover, by using a mixture containing an unsaturated carboxylic compound with a degree of polymerization of less than 20 or a polyvalent metal salt of an unsaturated carboxylic acid compound with a degree of polymerization of less than 20 and 50% or less by weight of a water-soluble polymer, the method for manufacturing a gas-barrier film and gas-barrier layered body of the present invention allows easy application to a substrate of any shape even if the substrate layer is in film form, and easily provides a film comprising a polymer of an unsaturated carboxylic acid polyvalent salt compound which is highly neutralized or in other words has excellent gas barrier properties.

Moreover, in a mode in which a layer comprising a polymer of an unsaturated carboxylic acid compound polyvalent metal salt with extremely little free carboxylic acid or a layer comprising a polymer of a carboxylic acid compound polyvalent salt is layered atop an inorganic compound deposition layer, not only are excellent gas barrier properties (oxygen barrier properties) obtained under highly humid conditions, but the moisture-proofing (barrier properties against water vapor) and hot water resistance are also excellent.

Moreover, a gas-barrier layered body comprising a substrate layer having layered thereon a gas-barrier film comprising an unsaturated carboxylic acid compound polyvalent metal salt copolymer containing 50% or less mole of an unsaturated carboxylic acid compound univalent metal salt gas excellent gas barrier properties under highly humid conditions because it contains little free carboxylic acid.

Moreover, a gas-barrier film comprising a copolymer of an unsaturated carboxylic acid compound polyvalent metal salt with 50% or less by weight of a polyvalent unsaturated carboxylic acid ester and a gas-barrier film comprising a polymer of an unsaturated carboxylic acid compound polyvalent metal salt containing 50% or less by weight of a water-soluble polymer are both very transparent and have excellent gas barrier properties against, oxygen, water vapor and the like, particularly under highly humid conditions, as well as being flexible.

INDUSTRIAL APPLICABILITY

The gas-barrier film comprising a polymer of a polyvalent metal salt of a carboxylic acid compound and the gas-barrier layered body having this gas-barrier film formed thereon of the present invention have excellent resistance to oxygen permeation (gas barrier properties) under highly humid conditions, and because of this property they can be used favorably as packaging materials, particularly food packaging materials for contents that require high gas barrier properties, and also as packaging materials for medical uses, electronic materials, industrial uses and a variety of other products, or as protective materials for electronic materials, medical products, and other materials that need to be protected from oxygen gas and moisture.

The invention claimed is:

1. A method for manufacturing a gas-barrier film or gas-barrier layered body that gives an infrared absorption spectrum in which the ratio ($A_0/A$) of the absorbance $A_0$ at around 1,700 cm$^{-1}$ attributable to the vC=O of the carboxylic acid groups to the absorbance A at around 1,520 cm$^{-1}$ attributable to the vC=O of the carboxylate ions is 0.06 or lower wherein a polyvalent metal salt solution of an unsaturated carboxylic acid monomer is applied to at least one side of a substrate or substrate layer (C), and the polyvalent metal salt of the unsaturated carboxylic acid monomer is then polymerized.

2. The method for manufacturing a gas-barrier film or gas-barrier layered body according to claim 1, wherein substrate layer (C) has an inorganic compound deposition layer (D) formed thereon.

3. The method for manufacturing a gas-barrier film or gas-barrier layered body according to claim 1, wherein substrate layer (C) is a hollow body (C2).

4. The method for manufacturing a gas-barrier film or gas-barrier layered body according to claim 1, wherein the unsaturated carboxylic acid monomer is (meth)acrylic acid monomer.

5. The method for manufacturing a gas-barrier film or gas-barrier layered body according to claim 1, wherein the polyvalent metal salt of the unsaturated carboxylic acid monomer is polymerized in the presence of moisture.

6. A gas-barrier film or gas-barrier layered body obtained by the layered ring method according to claim 1.

7. A method for manufacturing a gas-barrier film or gas-barrier layered body that gives an infrared absorption spectrum in which the ratio ($A_0/A$) of the absorbance $A_0$ at around 1,700 cm$^{-1}$ attributable to the vC=O of the carboxylic acid groups to the absorbance A at around 1,520 cm$^{-1}$ attributable to the vC=O of the carboxylate ions is 0.06 or lower, wherein a solution comprising a (meth)acrylic acid compound with a degree of polymerization below 20 and a polyvalent metal compound is applied to at least one side of a substrate or substrate layer (C), and the (meth)acrylic acid polyvalent metal salt of the (meth)acrylic acid compound is then polymerized.

8. The method for manufacturing a gas-barrier film or gas-barrier layered body according to claim 1 or 7, wherein the solution comprises at least one of 50% mole or less of a univalent metal salt of an unsaturated carboxylic acid compound, 50% or less by weight of a polyvalent unsaturated carboxylic ester and 50% or less by weight of a water-soluble polymer (B).

9. The method for manufacturing a gas-barrier film or gas-barrier layered body according to claim 1 or 7, wherein the solution is an aqueous solution.

10. The method for manufacturing a gas-barrier film or gas-barrier layered body according to claim 1 or 7, wherein substrate layer (C) is a film substrate (C1).

11. The method for manufacturing a gas-barrier film or gas-barrier layered body according to claim 7, wherein the (meth)acrylic acid compound is a (meth)acrylic acid monomer or polymer with a degree of polymerization of 10 or less.

12. The method for manufacturing a gas-barrier film or gas-barrier layered body according to claim 7, wherein the (meth)acrylic acid polyvalent metal salt of the (meth)acrylic acid compound is polymerized in the presence of moisture.

* * * * *

UNITED STATES PATENT AND TRADEMARK OFFICE
CERTIFICATE OF CORRECTION

PATENT NO.        : 8,703,298 B2
APPLICATION NO.   : 11/568783
DATED             : April 22, 2014
INVENTOR(S)       : Nakamura et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1306 days.

Signed and Sealed this
Twenty-ninth Day of September, 2015

Michelle K. Lee
*Director of the United States Patent and Trademark Office*